(12) United States Patent
Åkesson et al.

(10) Patent No.: US 12,127,080 B2
(45) Date of Patent: Oct. 22, 2024

(54) MBSFN AREA PATTERNS TO AUTOMATICALLY HANDLE RESOURCE ALLOCATIONS WITHOUT CONFLICT

(71) Applicant: Telefonaktiebolaget LM Ericsson (publ), Stockholm (SE)

(72) Inventors: Joakim Åkesson, Landvetter (SE); Jinyang Xie, Shanghai (CN); Salvador Hinarejos Fernandez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 17/619,336

(22) PCT Filed: Jun. 15, 2020

(86) PCT No.: PCT/EP2020/066481
§ 371 (c)(1),
(2) Date: Dec. 15, 2021

(87) PCT Pub. No.: WO2020/254245
PCT Pub. Date: Dec. 24, 2020

(65) Prior Publication Data
US 2022/0240056 A1 Jul. 28, 2022

(30) Foreign Application Priority Data
Jun. 18, 2019 (WO) ............... PCT/CN2019/091693

(51) Int. Cl.
*H04W 4/06* (2009.01)
*H04W 4/021* (2018.01)
(Continued)

(52) U.S. Cl.
CPC ............. *H04W 4/06* (2013.01); *H04W 4/021* (2013.01); *H04W 16/18* (2013.01); *H04W 72/30* (2023.01)

(58) Field of Classification Search
CPC ....... H04W 4/06; H04W 72/30; H04W 4/021; H04W 16/18; H04W 72/23; H04L 5/0058; H04L 5/0091; H04L 5/0094
See application file for complete search history.

(56) References Cited

U.S. PATENT DOCUMENTS

2011/0013554 A1* 1/2011 Koskinen .............. H04L 5/0091
370/329
2014/0241232 A1* 8/2014 Damji ................. H04L 25/0226
370/312
(Continued)

FOREIGN PATENT DOCUMENTS

EP 2427014 A1 3/2012

OTHER PUBLICATIONS

Author Unknown, "Technical Specification Group Services and System Aspects; Common functional architecture to support mission critical services; Stage 2 (Release 16)," Technical Specification 23.280, Version 16.3.0, Jun. 2019, 3GPP Organizational Partners, 221 pages.

(Continued)

*Primary Examiner* — Rushil P. Sampat
(74) *Attorney, Agent, or Firm* — Sage Patent Group

(57) ABSTRACT

Systems and methods for auto creation of Multicast-Broadcast Single Frequency Network (MBSFN) areas are disclosed. In some embodiments, systems and methods are disclosed for providing different MBSFN area pattern types for different cell coverage and density conditions for better resource usage. In some embodiments, systems and methods are disclosed for providing tools to a customer to plan MBSFN broadcast areas and to automatically generate MBSFN Hexagon areas and allocate a proper MBSFN area pattern for the MBSFN Hexagon areas to avoid manual configuration of the MBSFN area for each cell. In some embodiments, systems and methods are disclosed for pro- (Continued)

viding a solution to help network operators to remote set MBSFN areas' configuration to a network wide Radio Access Network (RAN). In some embodiments, systems and methods are disclosed for providing tools to present cells, cell range, MBSFN area locations, and configurations and enhanced or evolved Node Bs' (eNBs') relationship.

12 Claims, 18 Drawing Sheets

(51) Int. Cl.
    *H04W 16/18*     (2009.01)
    *H04W 72/30*     (2023.01)

(56) References Cited

U.S. PATENT DOCUMENTS

| | | | |
|---|---|---|---|
| 2015/0208208 A1* | 7/2015 | You | H04W 72/30 370/312 |
| 2016/0270031 A1 | 9/2016 | Sundaresan et al. | |
| 2017/0048820 A1* | 2/2017 | Wang | H04L 5/0048 |

OTHER PUBLICATIONS

Author Unknown, "Technical Specification Group Services and System Aspects; Multimedia Broadcast/Multicast Service (MBMS); Protocols and codecs (Release 16)," Technical Specification 26.346, Version 16.2.0, 3GPP Organizational Partners, 258 pages.

Author Unknown, "Technical Specification Group Radio Access Network; Evolved Universal Terrestrial Radio Acces (E-UTRA) and Evolved Universal Terrestrial Radio Access Network (E-UTRAN); Overall description; Stage 2 (Release 15)," Technical Specification 36.300, Version 15.5.0, Mar. 2019, 3GPP Organizational Partners, 363 pages.

Catt, "R2-140137: Stage 2 Issues for Further MBMS Operations Support," 3GPP TSG RAN WG2 Meeting #85, Feb. 10-14, 2014, Prague, Czech Republic, 6 pages.

Catt,"R3-070217: Consideration about SFN management," 3GPP TSG RAN WG3 Meeting #55, Feb. 12-16, 2007, St. Louis, Missouri, 3 pages.

International Search Report and Written Opinion for International Patent Application No. PCT/EP2020/066481, mailed Sep. 15, 2020, 11 pages.

* cited by examiner

MBSFN AREA PATTERNS TO AUTOMATICALLY HANDLE RESOURCE ALLOCATIONS WITHOUT CONFLICT

This application is a 35 U.S.C. § 371 national phase filing of International Application No. PCT/EP2020/066481, filed Jun. 15, 2020, which claims the benefit of International Application No. PCT/CN2019/091693, filed Jun. 18, 2019, the disclosures of which are incorporated herein by reference in their entireties.

TECHNICAL FIELD

The present application relates to Multicast-Broadcast Single Frequency Network (MBSFN) area creation.

BACKGROUND

Mission Critical Push-to-Talk (MCPTT) Overview

The MCPTT service supports an enhanced Push-to-Talk (PTT) service that is suitable for mission critical scenarios. The MCPTT service is intended to support communications between several users (a group call), where each user has the ability to gain access to the permission to talk in an arbitrated manner.

The MCPTT primarily targets to provide a professional PTT service to public safety, transport companies, utilities, industrial and nuclear plants, and so on. Based on the operational model, the performance and the MCPTT feature set vary per user organization, where some functionality that is more mission critical specific might not be available to commercial customers.

The MCPTT users often monitor several groups where the traffic pattern is characterized by the following:
  Long periods of silence
  Short MCPTT group calls, typically 20-30 seconds
  Few talk bursts in each call, typically 4-8 talk bursts
  Access time (also known as call setup time)<300 milliseconds (ms)
  Mouth-to-ear latency<300 ms MCPTT Over Long Term Evolution (LTE)

The current public safety networks (Terrestrial Trunked Radio (TETRA) and Project 25 (P25)) are narrowband systems that were originally designed to support voice and low bitrate data services. Those legacy networks are not able to provide the necessary high-speed data performance to support the multimedia applications on which current public safety agencies are increasingly relying. More specifically, those legacy networks are not able to provide support for data intensive services such as real time video streaming, file downloads, and web browsing. These services supplement the MCPTT service by providing improved situation awareness for both first responders and dispatchers.

LTE is established as the prime technology for the next generation of the broadband public safety network. The broadband communications enabled by LTE are suitable for providing high-rate data and low-latency video services, which enable new ways of working for emergency services.

The market trend requests that the MCPTT for first responders be transitioned from the current narrowband network technologies to LTE. The LTE network can further enable other mission critical services such as mission critical video delivery and mission critical data delivery.

In the mobile transmission network, radio resources are limited and depend on demand. Therefore, the end user Quality of Experience (QoE) cannot always be guaranteed.

LTE broadcast, also known as enhanced Multicast-Broadcast Multimedia Service (eMBMS), provides a Point To Multipoint (PTM) delivery method. This method is offered by cellular networks that overcome the air limitations of unicast transmission, which is Point to Point (PTP). The method enables content delivery in an efficient way in both the Radio Access Network (RAN) and the core network.

FIG. 1

FIG. 1 illustrates the MCPTT On-Network Architecture.

LTE broadcast enables synchronized transmission between multiple transmitters in the form of Multicast-Broadcast Single Frequency Network (MBSFN) operation. In this way, identical signals are being broadcast by multiple transmitters synchronously. Then, the inter-cell interference can be avoided, and the Signal-to-Interference Ratio (SIR) can be dramatically increased.

MCPTT is just one of the Mission Critical Services for which the MCPTT On-network Architecture could be used for Mission Critical (MC) Data, MC video, and other group communication services. The description provided herein is applicable to any MC service or group communication service, and is not limited to MCPTT.

MBSFN Area Configuration (See, e.g., Third Generation Partnership Project (3GPP) Technical Specification (TS) 36.300)

An MBSFN Area consists of a group of cells within an MBSFN Synchronization Area of a network, which are coordinated to achieve an MBSFN Transmission.

FIG. 2

As illustrated in FIG. 2, it has been proposed to mitigate the interference problem by configuring some selected cells in a ring just outside the MBSFN area to be silent on those subframes that are used for broadcast by the MBSFN area cells. These cells are called "Reserved cells". Except for the MBSFN Area Reserved Cells, all cells within an MBSFN Area contribute to the MBSFN Transmission and advertise its availability. The MBSFN Synchronization Area, the MBSFN Area, and the MBSFN cells are semi-statically configured, e.g., by Operation and Maintenance (O&M). MBSFN areas are static, unless changed by O&M.

Problems with Existing Solutions

For traditional video broadcasting, the typical use case is to broadcast the same contents to a large area. But for a group communication service, the service operators would like to broadcast only to the area(s) where (most of) the group members are located—for increased resource efficiency. The service operators would also like to re-use the same subframes in other (non-interfering) areas to broadcast other group communication services. In an MBSFN area, there could typically be some 10 to 30 cells contributing to the same MBSFN transmission—and the cell range, radio conditions, and location of these cells vary a lot. Also, only a very limited number of non-interfering subframe patterns can be created with LTE based MBSFN transmission. In particular, there are six subframes (Frequency Division Duplexing (FDD)) available per radio frame (10 ms); and, to reduce latency, the service operators typically want to have a Multicast Channel (MCH) Scheduling Period (MSP) of 40 ms or lower. This means that there are only 24 subframes to split between a number of non-interfering MBSFN configurations. If the service operators want to assign, e.g., six subframes per MBSFN configuration (e.g., to achieve sufficient capacity in the area for the high bandwidth service, e.g., MC Video), there are only four MBSFN configurations available. Even fewer subframes or configurations are available if some subframes needs to be reserved for other purposes or if an even lower MSP is desired.

To plan which cells to be included in an MBSFN area in a nation-wide network with 1000s or even 10,000s of cells under above conditions, and without causing any significant radio interference between MBSFN areas using the same subframe configuration, is a huge operational challenge. There are no tools or procedures available to significantly simplify this operational challenge.

SUMMARY

Systems and methods for auto creation of Multicast-Broadcast Single Frequency Network (MBSFN) areas are disclosed herein. In some embodiments, systems and methods are disclosed herein for providing different MBSFN area pattern types for different cell coverage and density conditions for better resource usage. In some embodiments, systems and methods are disclosed herein for providing (potentially map based) tools to a customer (e.g., of a network operator) to plan MBSFN broadcast areas and to automatically generate MBSFN Hexagon areas and allocate a proper MBSFN area pattern for the MBSFN Hexagon areas to avoid manual configuration of the MBSFN area for each cell. In some embodiments, systems and methods are disclosed for providing a solution to help network operators to remote set MBSFN areas' configuration to a network wide Radio Access Network (RAN), for example via Operations Support System (OSS). In some embodiments, systems and methods are disclosed for providing (potentially map based) tools to present cells, cell range, MBSFN area locations, and configurations and enhanced or evolved Node Bs' (eNBs') relationship.

In some embodiments, a hexagon based procedure is used to simplify a complex distribution of a very large number of radio base stations and associated range of the cells of these base stations. With the hexagon based procedure, it can be guaranteed that there are no MBSFN resource conflicts. It can also be very efficiently controlled that interference is kept to a level not impacting the service provided over the network. Embodiments of a method performed by a Multicast-Broadcast Multimedia Service (MBMS) area manager tool implemented by one or more network nodes for programmatically creating MBSFN areas and corresponding embodiments of the one or more network nodes are disclosed. In some embodiments, the method comprises creating a plurality of MBSFN area patterns. For each MBSFN area pattern of the plurality of MBSFN area patterns, the MBSFN area pattern comprises one or more subframe configurations for MBMS resource allocation, and each subframe configuration of the MBSFN area pattern defines a set of subframes MBMS resource allocation for the MBSFN area pattern. The method further comprises creating a plurality of MBSFN areas that cover a desired geographical area using a select one or more of the plurality of MBSFN area patterns.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
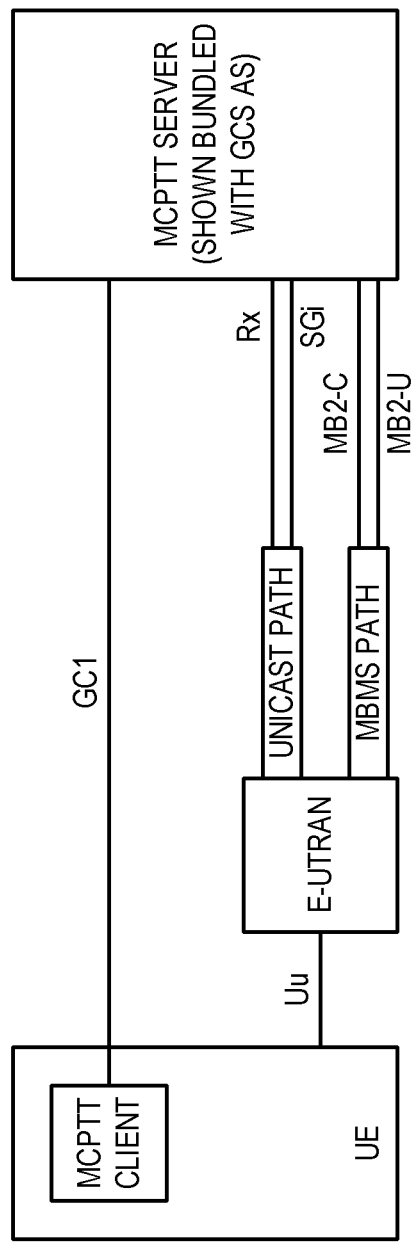
FIG. 1 illustrates the Mission Critical Push-to-Talk (MCPTT) On-Network Architecture.
Figure 2:
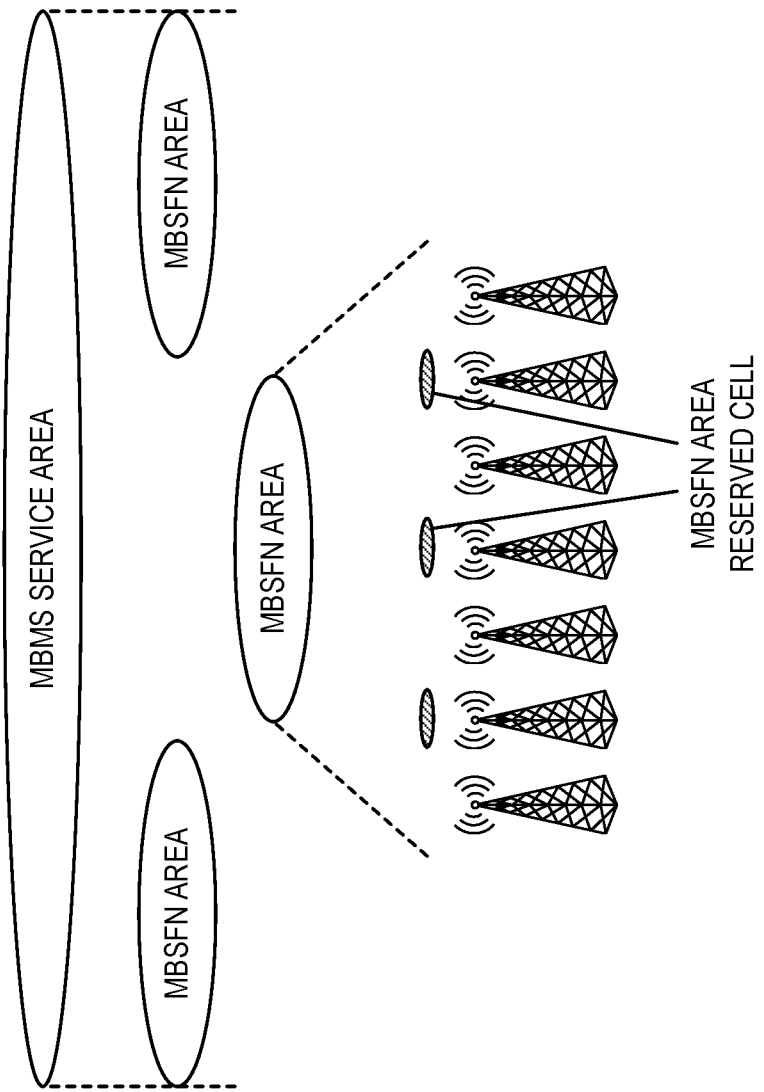
FIG. 2 illustrates a Multicast-Broadcast Multimedia Service (MBMS) area in which interference is mitigated by configuring some selected cells as reserved cells.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that the description given herein focuses on a Third Generation Partnership Project (3GPP) cellular communications system and, as such, 3GPP terminology or terminology similar to 3GPP terminology is oftentimes used. However, the concepts disclosed herein are not limited to a 3GPP system.

The present disclosure describes embodiments of a solution that address at least some of the problems with existing solutions described above. In some embodiments, systems and methods are disclosed herein for providing different Multicast-Broadcast Single Frequency Network (MBSFN) area pattern types for different cell coverage and density conditions for better resource usage. In some embodiments, systems and methods are disclosed herein for providing (potentially map based) tools to a customer (e.g., of a network operator) to plan MBSFN broadcast areas and to automatically generate MBSFN Hexagon areas and allocate a proper MBSFN area pattern for the MBSFN Hexagon areas to avoid manual configuration of the MBSFN area for each cell. In some embodiments, systems and methods are disclosed for providing a solution to help network operators to remote set MBSFN areas' configuration to a network wide Radio Access Network (RAN), for example via Operations Support System (OSS). In some embodiments, systems and methods are disclosed for providing (potentially map based) tools to present cells, cells' coverage, MBSFN area locations, and configurations and enhanced or evolved Node Bs' (eNBs') relationship.

In some embodiments, a hexagon based procedure is used to simplify a complex distribution of a very large number of radio base stations and associated range of the cells of these base stations. With the hexagon based procedure, it can be guaranteed that there are no MBSFN resource conflicts. It can also be very efficiently controlled that interference is kept to a level not impacting the service provided over the network. Embodiments of the present disclosure provide the following advantages. Embodiments disclosed herein provide (possibly map based) tools to a customer to plan MBSFN broadcast areas and to automatically generate MBSFN Hexagon areas and allocate a proper MBSFN area pattern for the MBSFN Hexagon areas to avoid manually configuring the MBSFN area on each cell. This resolves operational complexity and reduces configuration errors. Embodiments disclosed herein provide (possibly map based) tools to help operators to remote set the MBSFN areas' configuration to RAN for example via OSS. Embodiments disclosed herein provide a hexagon-based algorithm that secures no resource conflicts and efficiently limits the risk of MBSFN interference, given that at least three non-conflicting MBSFN subframe configurations have been created. Embodiments disclosed herein provide different MBSFN area pattern types for the different cell coverage and density conditions for better resource usage.

Now, the discussion turns to a more detailed description of embodiments of the present disclosure.

A Multicast-Broadcast Multimedia Service (MBMS) bearer for Mission Critical (MC) Service is typically used for the purposes beyond the benefit for using MBMS for resource efficiency, e.g. for improved MC service performance (Key Performance Indicators (KPIs)), handling of high load scenarios, etc. The broadcasting of the MC service is mainly based on counting of group members in each defined service area. According to the essence of MC service or group communication service, the members of one Group will often or typically gather together in the certain areas. Due to the mobility of the end users, the size of such an area in which members of one Group will often or typically gather together is uncertain—this area could be small or it could be large. In order to ensure that all the members in this area can receive the group communication service data, the arbitrary solution is to create an MBSFN area in this certain area. But one MBSFN area for this certain area could be network inefficient when considering the number of users in this area. The MC Service should try to send the traffic to the Group Communication end users concentrated area rather than the larger areas. If the end users concentrated area(s) is served for one group communication session, the same resources in the neighboring MBSFN area(s) could be re-used to serve another group communication session. In essence, the size of one MBSFN area should be optimally balanced between robust coverage and resource efficiency for the group communication. In other words, the MBSFN area size is variable. It could be larger, for example cover 200 cells, or it could be small, for example cover 30 cells. If using small MBSFN areas where one or two small MBSFN areas could cover most of the UEs of the same group, the broadcast just needs to be started in these one or two MBSFN areas. If using the large MBSFN area, the broadcast must be started in this large MBSFN area, where this larger MBSFN area could cover all the UEs of the same group.

FIG. 3

Figure 3:
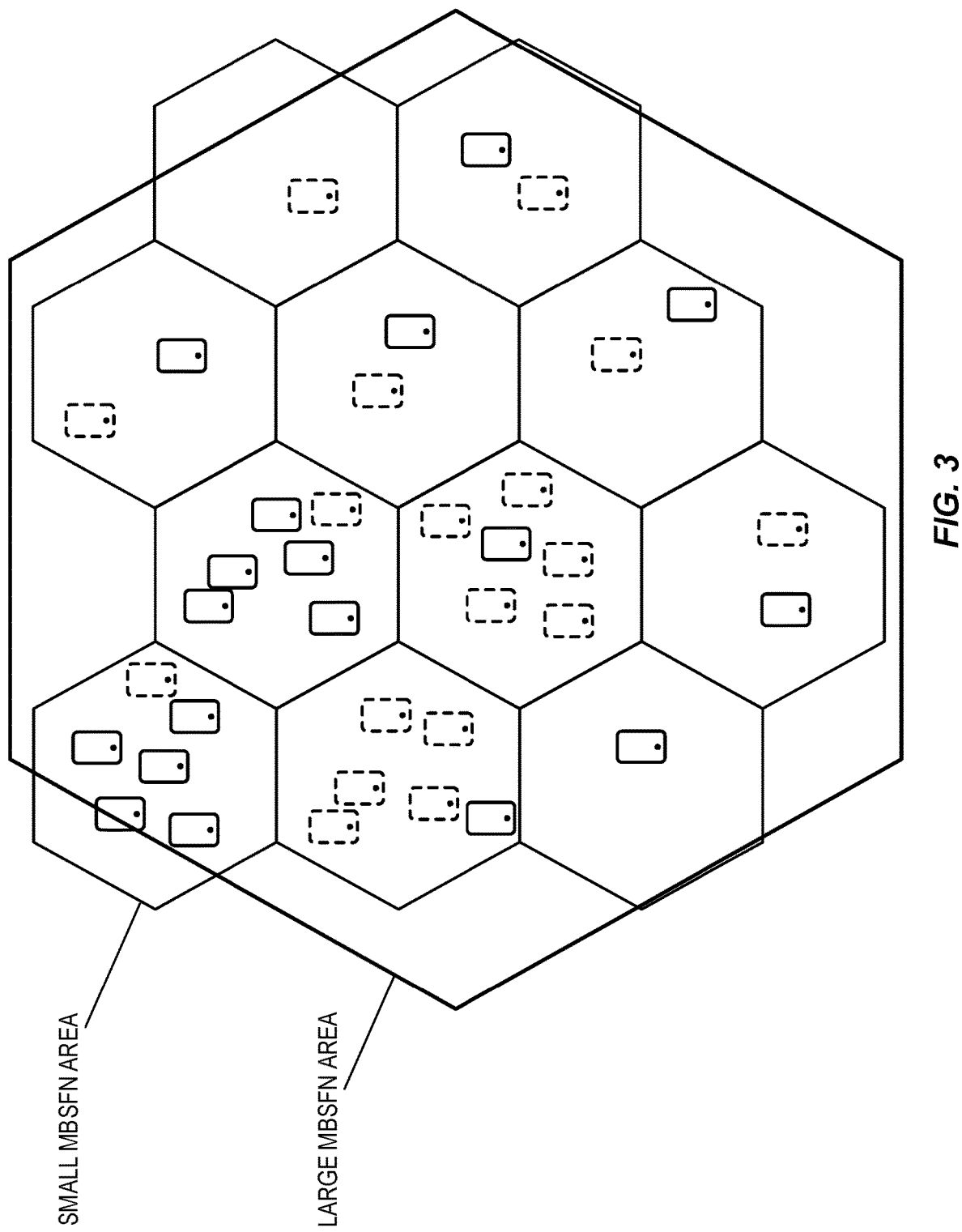
FIG. 3 illustrates an example of larger and smaller Multicast-Broadcast Single Frequency Network (MBSFN) areas for two example User Equipment (UE) groups.

However, when seen from the perspective of RAN resource efficiency, the large MBSFN area is not the better solution, as illustrated in the example of FIG. 3 where there are two group UEs. In the illustrated example, using small MBSFN areas should be better than the larger MBSFN area from the perspective of RAN resource efficiency.

An entity referred to herein as a Critical enhanced Multicast-Broadcast Multimedia Service (eMBMS) Controller (CEC) operates to: (a) manage the MBSFN Areas in the RAN and MBMS Bearers in the Broadcast-Multicast Service Center (BM-SC), (b) expose only required parameters to the Mission Critical Push-to-Talk (MCPTT) Application Server (AS) (denoted as MCPTT-AS) in the daily operations, and (c) ensure that complex or classified network parameters are not exposed.

For the MBMS Areas in the RAN, the CEC provides an MBMS Area Manager Map tool. As discussed below in detail, the MBMS area manager map tool uses MBSFN Area Patterns, together with eNB and cell topology information (e.g., eNB list including cell Identifiers (IDs) and associated data and topology information) obtained from, for example, the OSS and/or a Cell Planning Tool, to generate RAN MBSFN areas' Managed Objects (MOs) and manipulate the RAN MBMS configuration, for example, via an OSS restful import interface.

FIG. 4

Figure 4:
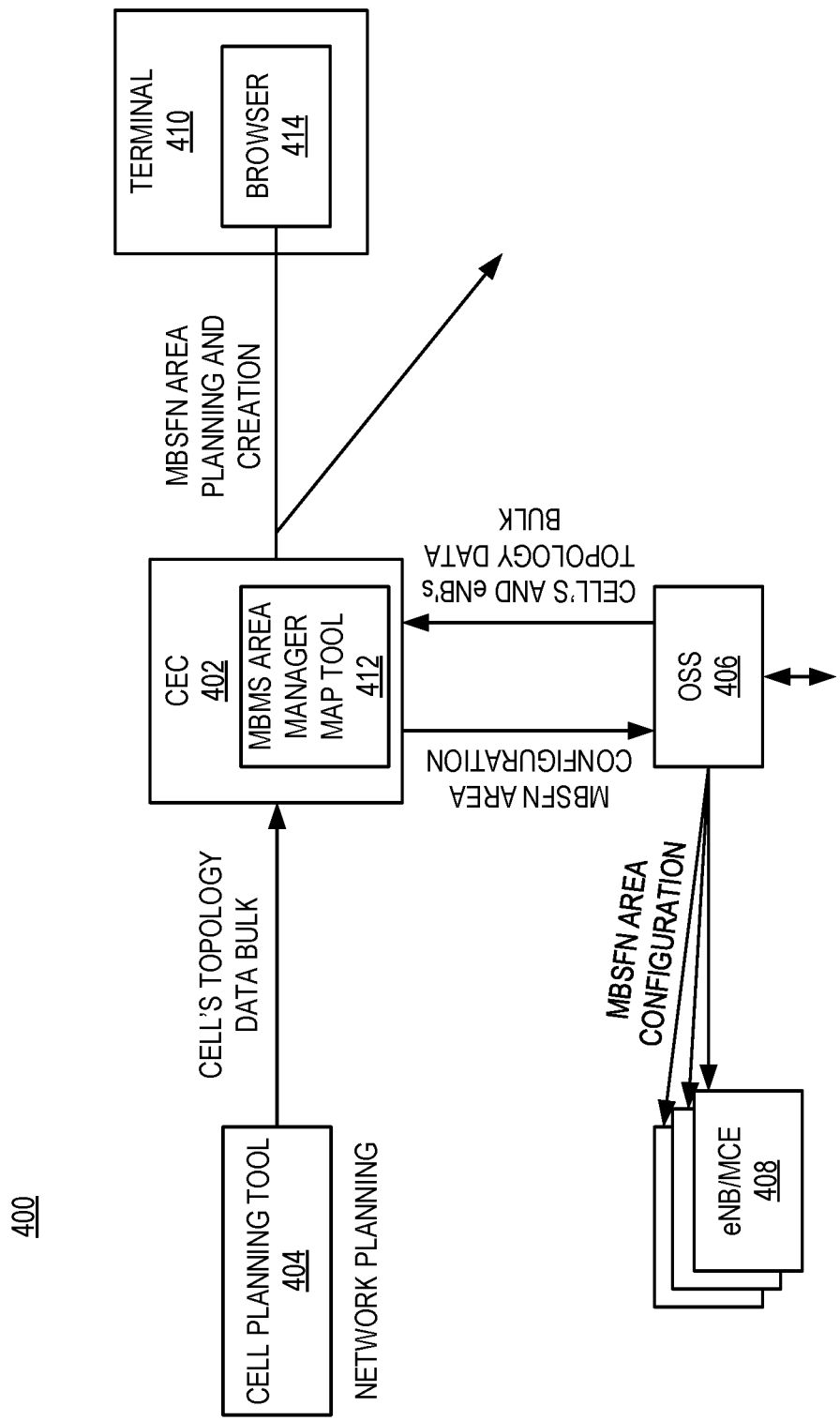
FIG. 4 illustrates a system including a Critical enhanced MBMS (eMBMS) Controller (CEC) including a MBMS area manager tool in accordance with one example embodiment of the present disclosure.

FIG. 4 illustrates a system 400 including a CEC 402 in accordance with one example embodiment of the present disclosure. As illustrated, the system 400 includes the CEC 402 communicatively coupled to a cell planning tool 404, an OSS 406 associated with a RAN including multiple eNBs and Multi-Cell/Multicast Coordination Entities (MCEs) (denoted eNBs/MCEs 408), and a user terminal 410. In this example, the CEC 402 provides a MBMS area manager map tool 412, and a user is enabled to use the MBMS area manager map tool 412 via a web browser 414 at the user terminal 410. Also, the CEC 402 may be implemented in a network node having a network interface(s) (e.g., Ethernet interface) and processing circuitry (e.g., one or more Central Processing Units (CPUs) and associated memory) or implemented in a distributed manner across two or more of such network nodes.

The OSS 406 supports the operation and maintenance of Radio, Transport, and Core Networks. The OSS 406 provides the cell and eNB topology information to the CEC 402. The cell and eNB topology information includes, for example, cell frequency band, cell location, cell coverage, etc. In some embodiments, the OSS 406 may not provide the functionality to configure and maintain this information. In this scenario, the separate cell planning tool 404 manages, e.g., the cell location (e.g., longitude and latitude) and the cell coverage polygon for network optimization.

The cell planning tool 404 provides the functionality to manage the cell location (longitude and latitude), cell coverage polygon, etc. for the network optimization.

FIG. 5

Figure 5:
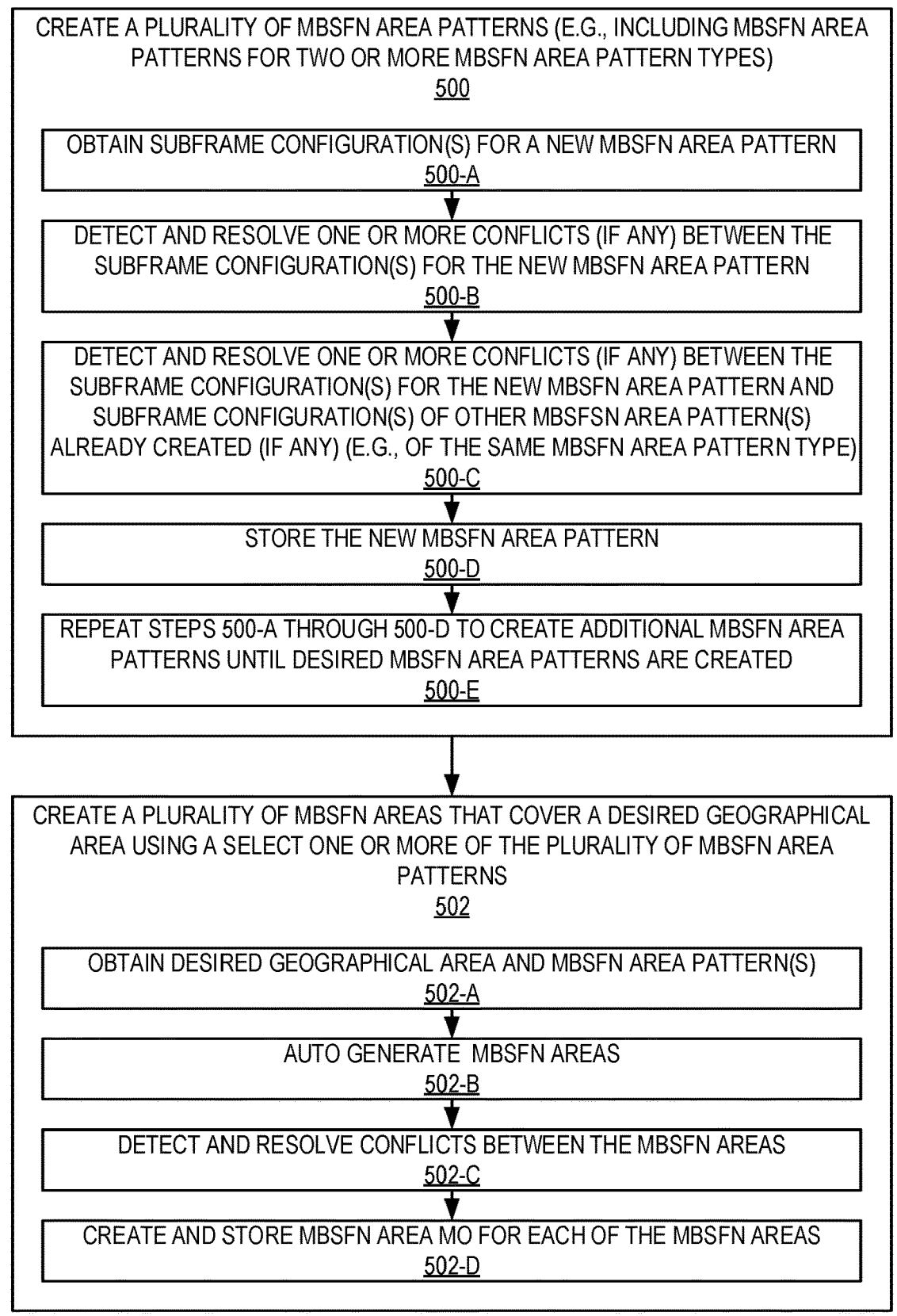
FIG. 5 is a flow chart that illustrates the operation of the CEC of FIG. 4 and, in particular the MBMS area manager tool, in accordance with some embodiments of the present disclosure.

FIG. 5 is a flow chart that illustrates a process performed by the CEC 402, and more specifically the MBMS area manager map tool 412, in accordance with some embodiments of the present disclosure. As illustrated, the CEC 402, and more specifically the MBMS area manager map tool 412, creates a plurality of MBSFN area patterns (step 500). For each MBSFN area pattern of the plurality of MBSFN area patterns, the MBSFN area pattern comprises one or more subframe configurations for MBMS resource allocation, and each subframe configuration of the MBSFN area pattern defines a set of subframes for MBMS resource allocation for the MBSFN area pattern. Further details about the creation of MBSFN area patterns are provided below and are applicable here. However, in some embodiments, the CEC 402, and more specifically the MBMS area manager map tool 412, obtains one or more subframe configurations (e.g., from the operator) for a new MBSFN area pattern (step 500-A). The CEC 402, and more specifically the MBMS area manager map tool 412, detects and resolves any conflicts between the subframe configurations for the new MBSFN area pattern (step 500-B). The CEC 402, and more specifically the MBMS area manager map tool 412, also detects and resolves any conflicts between the subframe configuration(s) of the new MBSFN area pattern and any of the other MBSFN area patterns that have already been created (e.g., for the same MBSFN area pattern type), if any (step 500-C). Once conflicts have been resolved, the CEC 402, and more specifically the MBMS area manager map tool 412, stores the new MBSFN area pattern (step 500-D). This process is repeated for each new MBSFN area pattern until the desired MBSFN area patterns have been created (step 500-E).

The CEC 402, and more specifically the MBMS area manager map tool 412, also creates a plurality of MBSFN areas that cover a desired geographical area using a select one or more of the plurality of MBSFN area patterns (step 502). The MBSFN areas are preferably hexagon-shaped; however, other shapes may be used. Preferably, the shape of the MBSFN areas prevent resource conflicts when constructing a large number of these areas. Further details about the creation of the MBSFN areas are provided below and are applicable here. However, in some embodiments, the CEC 402, and more specifically the MBMS area manager map tool 412, obtains input from an operator that defines the desired geographical area and one or more parameters such as the desired MBSFN area pattern type (step 502-A). The CEC 402, and more specifically the MBMS area manager map tool 412, automatically generates hexagon-shaped MBSFN areas that cover the desired geographic area using the desired MBSFN area patterns (step 502-B). The CEC 402, and more specifically the MBMS area manager map tool 412, detects and resolves any conflicts between the hexagon-shaped MBSFN area patterns (step 502-C). Once conflicts have been resolved, the CEC 402, and more specifically the MBMS area manager map tool 412, creates stores MOs for the created MBSFN areas (step 502-D).

The following sections will provide procedures for the MBSFN area pattern auto generation and MBSFN area auto generation in accordance with embodiments of the present disclosure.

1 eNB and Cell Topology Information Import

In order for the automatic MBSFN area creation, the first step is for the CEC 402 to obtain the eNB and cell topology information. In some embodiments, for each eNB, the eNB and cell topology information includes, for example:
the eNB ID of the eNB,
the geographical location of the eNB (e.g., latitude and longitude),
for each cell of one or more cells provided by the eNB:
cell ID,
cell type,
cell geographical location,
cell coverage polygon or cell coverage area including azimuth, OpeningAngle, and cell radius,
etc.

In some embodiments, the cells and eNBs are presented to the user at the user terminal 410 via the MBMS area manager map tool 412 and web browser 414, which will be helpful for the MBSFN areas generation. The cell information could be from the OSS 406, or from the OSS 406 and the cell planning tool 404.

The following is an example of the eNB and cell topology information for a particular eNB:
FDN:
"SubNetwork=SampleSubNetwork,
  MeContext=LTE05ERBS00026,ManagedElement=1,
  ENodeBFunction=1" ENodeBFunctionId: "1"
eNBId: 186
eNodeBPlmnId: {mcc=353, mnc=57, mncLength=2}
latitude: 53302254
longitude: −6514844
FDN:
"SubNetwork=SampleSubNetwork,
  MeContext=LTE05ERBS00026,ManagedElement=1,
  ENodeBFunction=1,EU
  tranCellFDD=LTE05ERBS00026-1"
EUtranCellFDDId: "LTE05ERBS00026-1"
cellRange: 15
dlChannelBandwidth: 10000
earfcndl: 2
eutranCellCoverage: {posCellOpeningAngle=−1, posCellRadius=0, posCellBearing=−1}
eutranCellPolygon: [ ]
freqBand: 1
latitude: 53302254
longitude: −6514844
UserLabel: "LTE05ERBS00026-1"
FDN:
"SubNetwork=SampleSubNetwork,
  MeContext=LTE05ERBS00026,ManagedElement=1,
  ENodeBFunction=1,EU
  tranCellFDD=LTE05ERBS00026-2"
EUtranCellFDDId: "LTE05ERBS00026-2"
cellRange: 15
dlChannelBandwidth: 10000
earfcndl: 2
eutranCellCoverage: {posCellOpeningAngle=−1, posCellRadius=0, posCellBearing=−1}
eutranCellPolygon: [ ]
freqBand: 1
latitude: 53301554
longitude: −6515844
UserLabel: "LTE05ERBS00026-2"

2 MBSFN Area Patterns and Conflict Auto Checks

Long Term Evolution (LTE) uses totally separate channel (logical and transport channel) for MBMS. Namely, for MBMS, LTE uses Multicast Control Channel (MCCH) for control information and Multicast Traffic Channel (MTCH) for data transmission. The information carried by MCCH includes subframe allocation and Modulation Coding Scheme (MCS). One of the most important characteristics with LTE MBMS is the introduction of MBSFN areas. All cells in such an area transmit the same eMBMS content in reserved subframes, finely time-synchronized so that the transmission from different cells are displayed as a multipath signal of one waveform to the receiving User Equipment (UE), leading to gain combining. The MBSFN subframe configuration defines the resources used for the broadcast. One MBSFN area could include one MBSFN subframe configuration list.

FIG. 6

Figure 6:
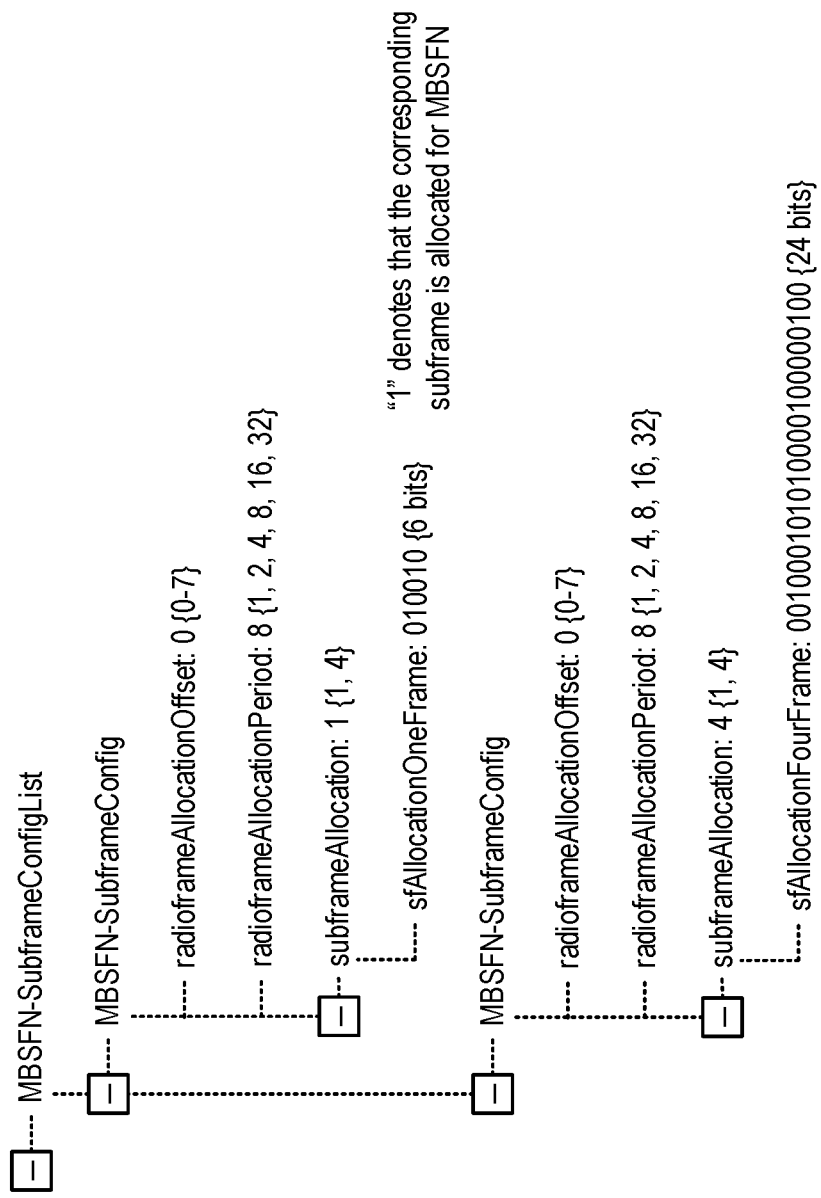
FIG. 6 illustrates a Multicast-Broadcast Single Frequency Network (MBSFN) subframe configuration list.

The subframe allocation pattern in the MBSFN subframe configuration list should not overlap, as shown in FIG. 6 which illustrates an MBSFN subframe configuration list overview. Although there are a few parameters, it is challenging to create a two-dimensional pattern of MBSFN areas for nation-wide cells that do not conflict or cause unwanted interference. If one cell is attributed to multiple MBSFN areas, the subframe in one MBSFN area cannot overlap with that of another MBSFN area. Otherwise, the new eMBMS session may not be activated if the overlapping subframe was already allocated to another eMBMS session. Furthermore, if the neighboring area/cells use the same subframes for the different eMBMS sessions, the signal for one eMBMS session will become an interfering signal for the other eMBMS session, which will result in a bad user experience (e.g., large packet loss) for the UEs located in the edges among these cells.

In order to provide automatic MBSFN area creation, the MBSFN area patterns should be defined. As the cell coverage and cell density conditions are different in different areas, it is recommended to separate the MBSFN area patterns into several pattern types such as, for example, a dense-urban pattern type, an urban pattern type, a sub-urban pattern type, and a rural pattern type. In addition or alternatively, a network operator could define its own pattern type(s).

In some preferred embodiments, for each MBSFN pattern type, at least three MBSFN area patterns are created or defined. An MBSFN area pattern should include the subframes that are reserved for MBSFN in downlink, signaling MCS, data MCS, Quality of Service Class Identifier (QCI), etc. The subframes inside one MBSFN area pattern should not overlap, and the subframes of MBSFN area patterns in the same MBSFN pattern type should not overlap. If there is subframe overlap between the MBSFN area patterns, the new bearer cannot be activated if the subframe was assigned to another bearer before. So, subframe overlap should be avoided during configuration.

2.1 Conflict Detection for the Subframes Inside an MBSFN Area Pattern

The subframe configuration in the MBSFN area pattern includes the radioframeAllocationOffset, radioframeAllocationPeriod, subframeAllocation, and sfAllocationOneFrame or sfAllocationFourFrame. The MBSFN area pattern includes the commonSFAllocPeriod.

For one MBSFN area pattern, it is possible to define multiple subframes for the MBMS resource allocation. For example, a first subframe configuration is: radioframeAllocationOffset=0, radioframeAllocationPeriod=2, subframeAllocation=1, sfAllocationValue=33, and commonSFAllocPeriod=32.

FIG. 7

Figure 7:
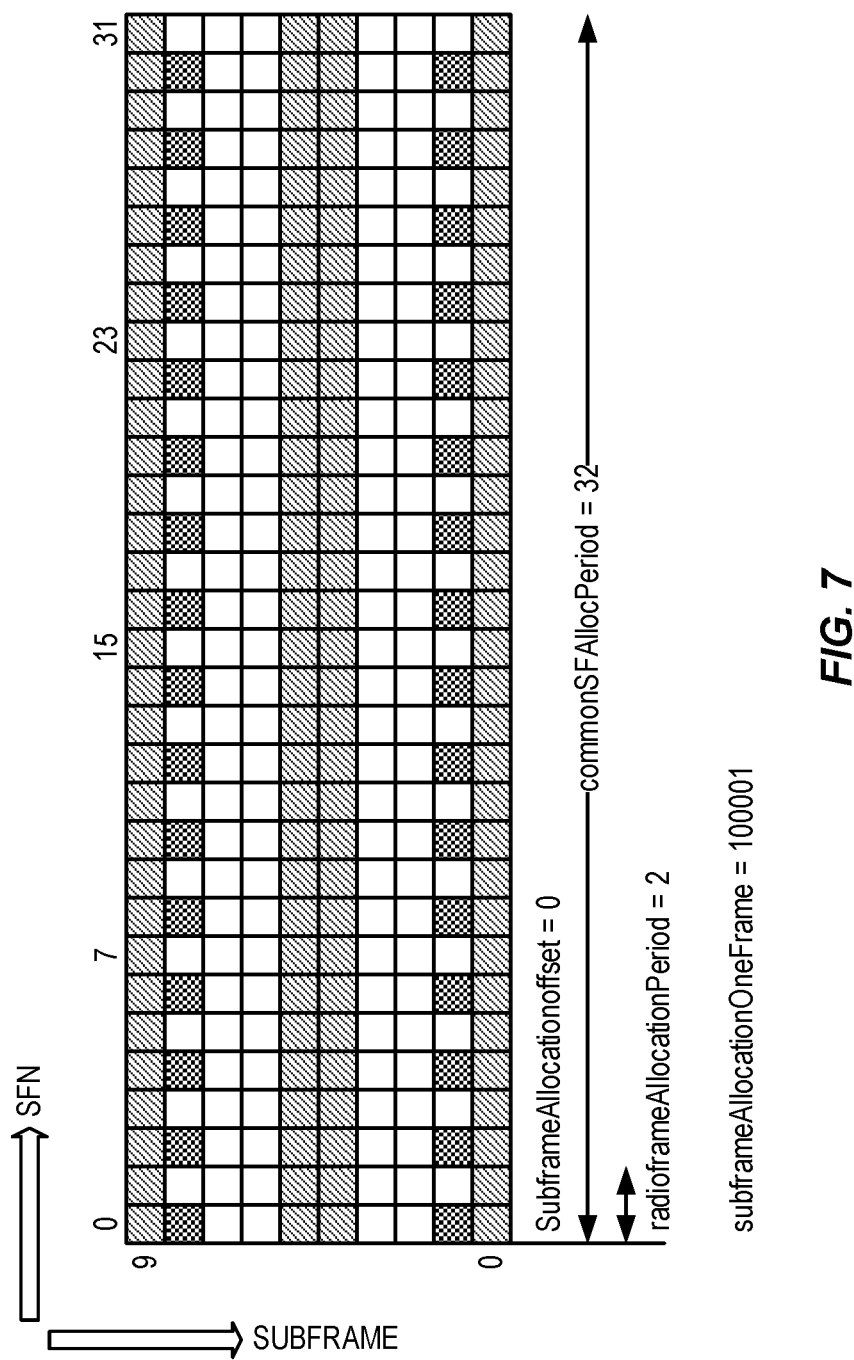
FIGS. 7, 8, and 9 illustrate example subframe configurations for a MBSFN area pattern in which there is a conflict.

The first subframe allocation is shown in FIG. 7.

For example, a second subframe configuration is: radioframeAllocationOffset=1, radioframeAllocationPeriod=2, subframeAllocation=1, sfAllocationValue=33, and commonSFAllocPeriod=32.

FIG. 8

Figure 8:
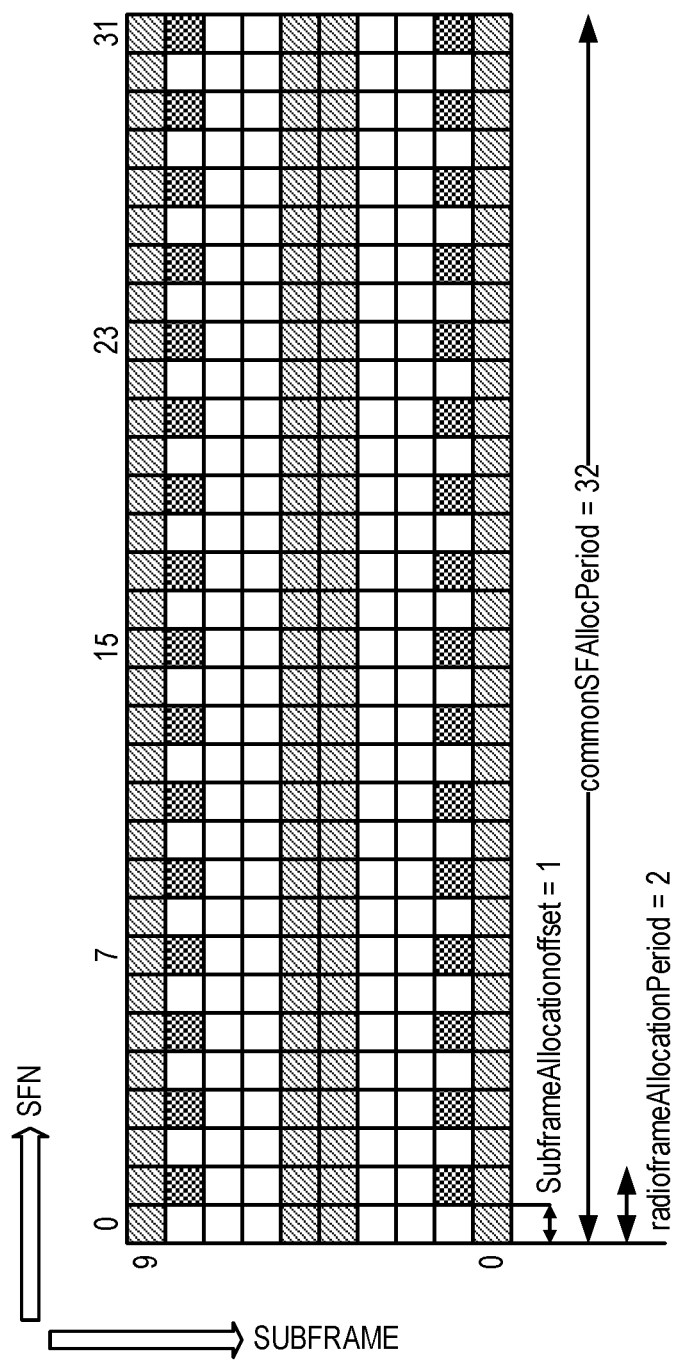

The second subframe configuration is shown in FIG. 8.

For example, a third subframe configuration is: radioframeAllocationOffset=2, radioframeAllocationPeriod=4, subframeAllocation=1, sfAllocationValue=17, and commonSFAllocPeriod=32.

FIG. 9

Figure 9:
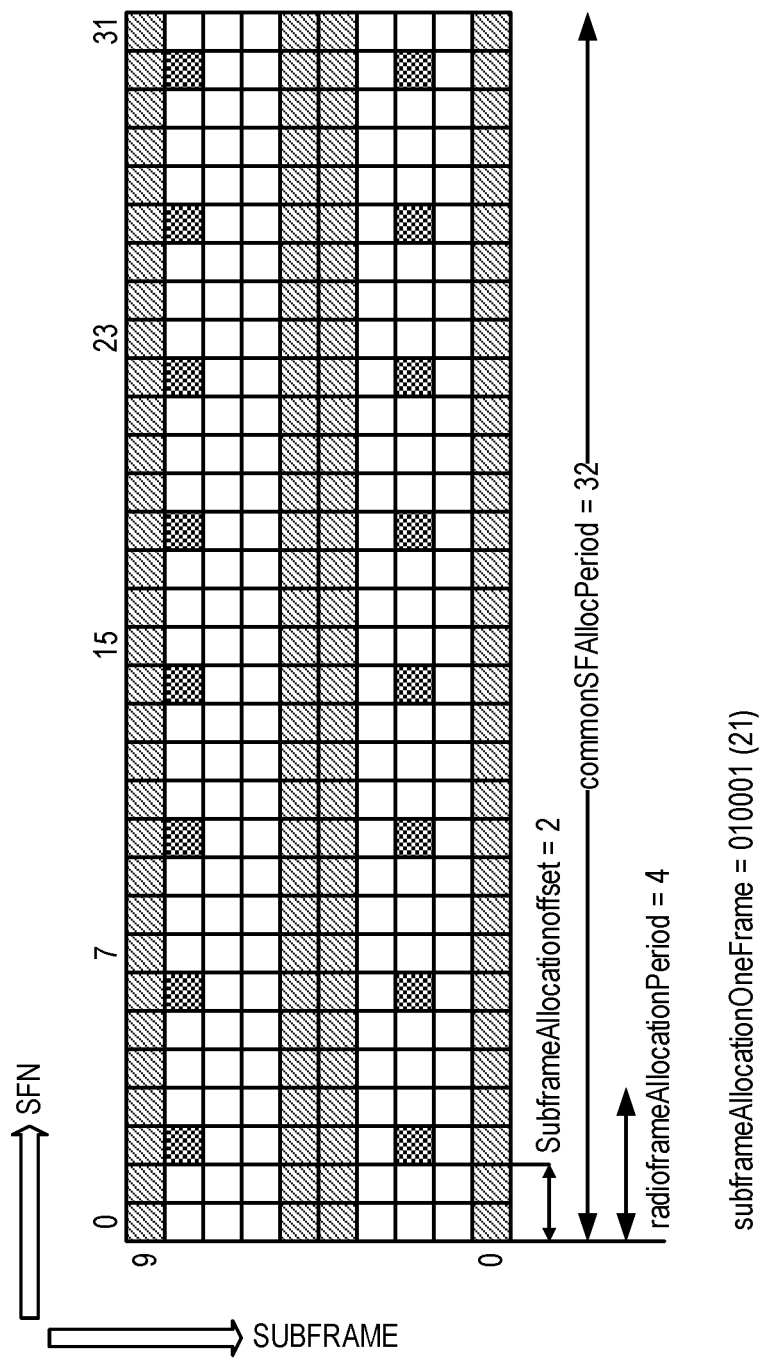

The third subframe configuration is shown in FIG. 9.

From FIGS. 7, 8, and 9, we can know that the third subframe configuration is in conflict with the first subframe configuration. The CEC 402, and in particular the MBMS area manager map tool 412, is able to detect such a subframe conflict.

The following is pseudocode for one example of a subframe conflict detection procedure performed by the CEC 402 and, more specifically, by the MBMS area manager map tool 412. Note that this pseudocode is only an example. Variations in this procedure are possible.

```
#! /usr/bin/python
import sys
# first subframe configuration
sfconfigAllocList0 = { 'radioframeAllocationOffset':0, 'radioframeAllocationPeriod':2,
'subframeAllocation':1, 'sfAllocationValue':33, 'commonSFAllocPeriod':32}
#second subframe configuration
sfconfigAllocList1 = { 'radioframeAllocationOffset':1, 'radioframeAllocationPeriod':2,
'subframeAllocation':1, 'sfAllocationValue':33, 'commonSFAllocPeriod':32}
#third subframe configuration
sfconfigAllocList2 ={ 'radioframeAllocationOffset':2, 'radioframeAllocationPeriod':4,
'subframeAllocation':1, 'sfAllocationValue':17 , 'commonSFAllocPeriod':32}
sfconfigAllocList =[ ]
sfconfigAllocList.append(sfconfigAllocList0)
sfconfigAllocList.append(sfconfigAllocList1)
sfconfigAllocList.append(sfconfigAllocList2)
#generate the subframe matrix based on the radioframe Allocation parameters
def
```

```
generateSubframeMatrix(radioframeAllocationOffset,radioframeAllocationPeriod,subframeAllocation,
sfAllocationValue,commonSFAllocPeriod):
    matrix1= { }
    sfn = 0
    while (sfn < commonSFAllocPeriod):
        # handle 1 subframe case
        if (subframeAllocation==1):
            if (( sfn % radioframeAllocationPeriod) == radioframeAllocationOffset):
                matrix1[sfn]= sfAllocationValue
            else:
                matrix1[sfn]= 0
            sfn = sfn +1
        # handle 4 subframe case
        else:
            if ( sfn % radioframeAllocationPeriod == radioframeAllocationOffset):
                matrix1[sfn]= sfAllocationValue>>3
                matrix1[sfn +1]= (sfAllocationValue>>2)&0x0f
                matrix1[sfn +2]= (sfAllocationValue>>1)&0x0f
                matrix1[sfn +3]= sfAllocationValue&0x0f
            else:
                matrix1[sfn]= 0
                matrix1[sfn +1]= 0
                matrix1[sfn +2]= 0
                matrix1[sfn +3]= 0
            sfn =sfn + 4
    return matrix1
# generate the subframe allocation matrix list
def createSfconfigList (sfconfigAllocList):
    sfconfig List = { }
    index=0
    while index < len(sfconfigAllocList):
        sfconfigList[index]=
generateSubframeMatrix(sfconfigAllocList[index]['radioframeAllocationOffset'],
sfconfigAllocList[index]['radioframeAllocationPeriod'], sfconfigAllocList[index]['subframeAllocation'],
sfconfigAllocList[index]['sfAllocationValue'], sfconfigAllocList[index]['commonSFAllocPeriod'])
        index = index + 1
    return sfconfig List
    # aggragate the multiple subframe allication list into one subframe allocation, which will be used
for the confliction among patterns
    def aggregateSfconfig(sfconfigList):
        aggregateSfConfig = { }
        index= 0
        temp = sfconfigList[0]
        while index < len(sfconfigList):
            sfconfig = sfconfigList[index]
            sfn = 0
            while sfn < len( sfconfig):
                aggregateSfConfig [sfn] = sfconfig[sfn] | temp[sfn]
                sfn = sfn + 1
            index = index + 1
            temp = aggregateSfConfig
    return aggregateSfConfig
def main(argv):
    # generate the subframe configuration matrix list based on configuration
    sfconfig List= createSfconfigList(sfconfigAllocList)
    #generate the aggregation subframe configuration
    agConfig = aggregateSfconfig(sfconfigList)
    confliction=0
    index = 0
    # check the subframe configuration conflict between each other
    while (index < len(sfconfigList)):
       repeat= index+1
       while (repeat< len(sfconfigList)):
           matrix1 = sfconfigList[index]
           matrix2 = sfconfigList[repeat]
           print("----matrix1----%s",matrix1)
           print("----matrix2----%s",matrix2)
           sfn=0
           while sfn < len(matrix1):
               if matrix1[sfn] & matrix2[sfn] == 0:
                   sfn = sfn +1
                   continue
               else:
                   print("confliection detected in %s, %s and %s" % (sfn, matrix1[sfn],matrix2[sfn] ))
                   confliction = 1
                   break
           if confliction==1:
               break
           repeat=repeat + 1
```

```
        if confliction==1:
            break
        index=index+1
if _name_=="_main_":
    main(sys.argv[1:])
```

For the simplification, the aggregateSfconfig may be stored in the CEC 402 for subframe conflict detection among the MBSFN area patterns that have the same MBSFN pattern type.

2.2 Conflict Detection for the Subframes Among MBSFN Area Patterns

The subframes of an MBSFN area pattern should not overlap the subframes of other MBSFN area patterns that have the same MBSFN area pattern type.

```
# check the mbsfn area pattern confliction with the existing mbsfn area
patterns who have the same pattern type
def conflictDetection (mbsfnAreaPattern1):
    confliction =0
    # get the existing mbsfn area patterns who have the same pattern type
    with the new pattern mbsfnAreaPatternList =
    getMbsfnAreaPatternList(mbsfnAreaPattern1.pattenType)
    # detect the subframe confliction with existing mbsfn area patterns
    one by one
    index = 0
    while (index < len (mbsfnAreaPatternList)):
        mbsfnAreaPattern2 = mbsfnAreaPatternList[index]
        sfn = 0
        while sfn<= len (mbsfnAreaPattern1.sfconfig) :
            if mbsfnAreaPattern1.sfconfig[sfn]& mbsfnAreaPattern2.sfconfig[sfn]
==0:
                sfn = sfn + 1
                continue
            else:
                confliction=1
                break
        index = index +1
        if (confliction ==1):
            break
return confliction
```

If there is a conflict among the subframes of MBSFN area patterns that have the same MBSFN area pattern type, the MBMS area manager map tool 412 preferably presents an alert to the user at the user terminal 410 (e.g., via a popup) and forces the user to correct the conflict (e.g., by changing the subframe configuration of one of the conflicting MBSFN area patterns).

FIG. 10

Figure 10:
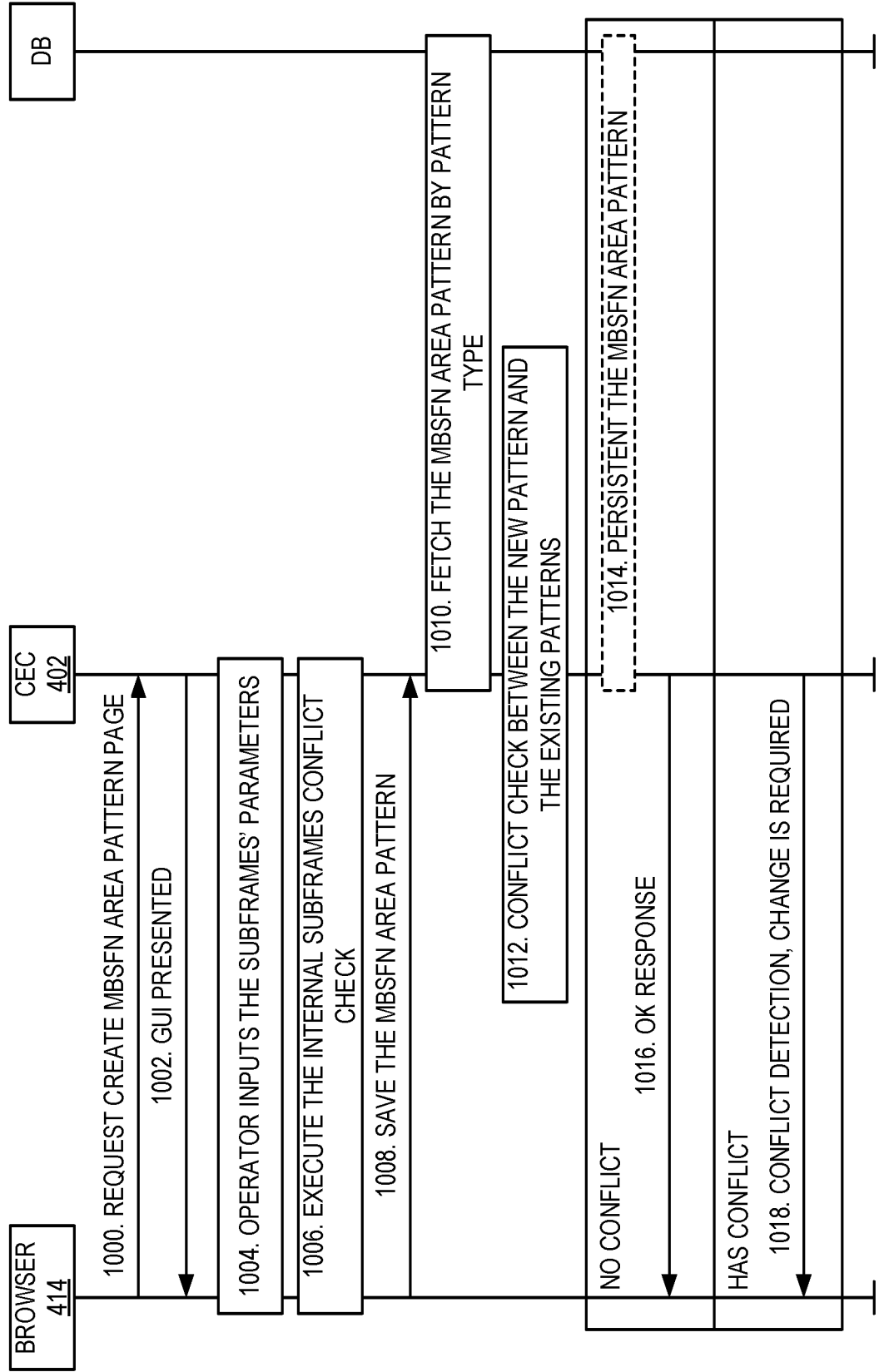
FIG. 10 illustrates a procedure for creating an MBSFN area pattern including conflict detection in accordance with some embodiments of the present disclosure.

FIG. 10 illustrates a procedure for creating an MBSFN area pattern including conflict detection in accordance with some embodiments of the present disclosure. This procedure includes both the conflict detection of section 2.1 and the conflict detection of section 2.2. As illustrated, via the web browser 414, the user terminal 410 sends a request for a create MBSFN area pattern page to the CEC 402 (step 1000). In response, the CEC 402, and more specifically the MBMS area manager map tool 412, provides a Graphical User Interface (GUI) of the MBMS area manager map tool 412 to the web browser 414 where the GUI is presented to the user (1002). The GUI is a graphical interface by which the user (also referred to herein as the operator) is enabled to interact with the MBMS area manager map tool 412 at the user terminal 410 via the web browser 414. Using the GUI, the user inputs subframe parameters (e.g., MBSFN area pattern type and subframe configuration parameters) for a desired MBSFN area pattern to be created (step 1004).

These subframe parameters include the parameters for one or more subframe configurations (e.g., the radioframeAllocationOffset, radioframeAllocationPeriod, subframeAllocation, and sfAllocationOneFrame or sfAllocationFourFrame for each of one or more MBSFN subframe configurations in a MBSFN subframe configuration list for the MBSFN area pattern being created, as discussed above).

The CEC 402, and more specifically the MBMS area manager map tool 412, performs the conflict detection procedure for detecting conflicts between the subframe configurations for this new MBSFN area pattern being created (step 1006). This conflict detection procedure is the conflict detection procedure described above with respect to section 2.1. During this conflict detect procedure, if a conflict is detected, the user is notified via the GUI and forced to correct the conflict. Once any conflicts have been fixed, the MBSFN area pattern is saved by the CEC 402 (step 1008).

Next, in order to detect conflicts between the subframe configuration(s) of the newly created MBSFN area pattern and other MBSFN area patterns of the same MBSFN area pattern type, the CEC 402, and more specifically the MBMS area manager map tool 412, obtains the subframe configurations of the other MBSFN area patterns of the same MBSFN area pattern type from, in this example, a database (step 1010). The CEC 402, and more specifically the MBMS area manager map tool 412, performs the conflict detection procedure described above in section 2.2 to detect any conflicts between the subframe configuration(s) of the newly created MBSFN area pattern and the subframe configurations of the other MBSFN area patterns already created for the same MBSFN area pattern type (step 1012). If no conflicts are detected, the CEC 402, and more specifically the MBMS area manager map tool 412, optionally stores the MBSFN area pattern in the database (step 1014) and notifies the operator that the MBSFN area pattern has successfully been created (step 1016). Otherwise, if a conflict is detected, the CEC 402, and more specifically the MBMS area manager map tool 412, notifies the operator via the GUI at the web browser 414 that a conflict has been detected and that a change is required (step 1018). Once the operator makes a change, the procedure returns to, e.g., step 1006.

3 MBSFN Area Generation

When the cell and MBSFN area patterns are ready, the operator can now generate the MBSFN areas.

FIG. 11

Figure 11:
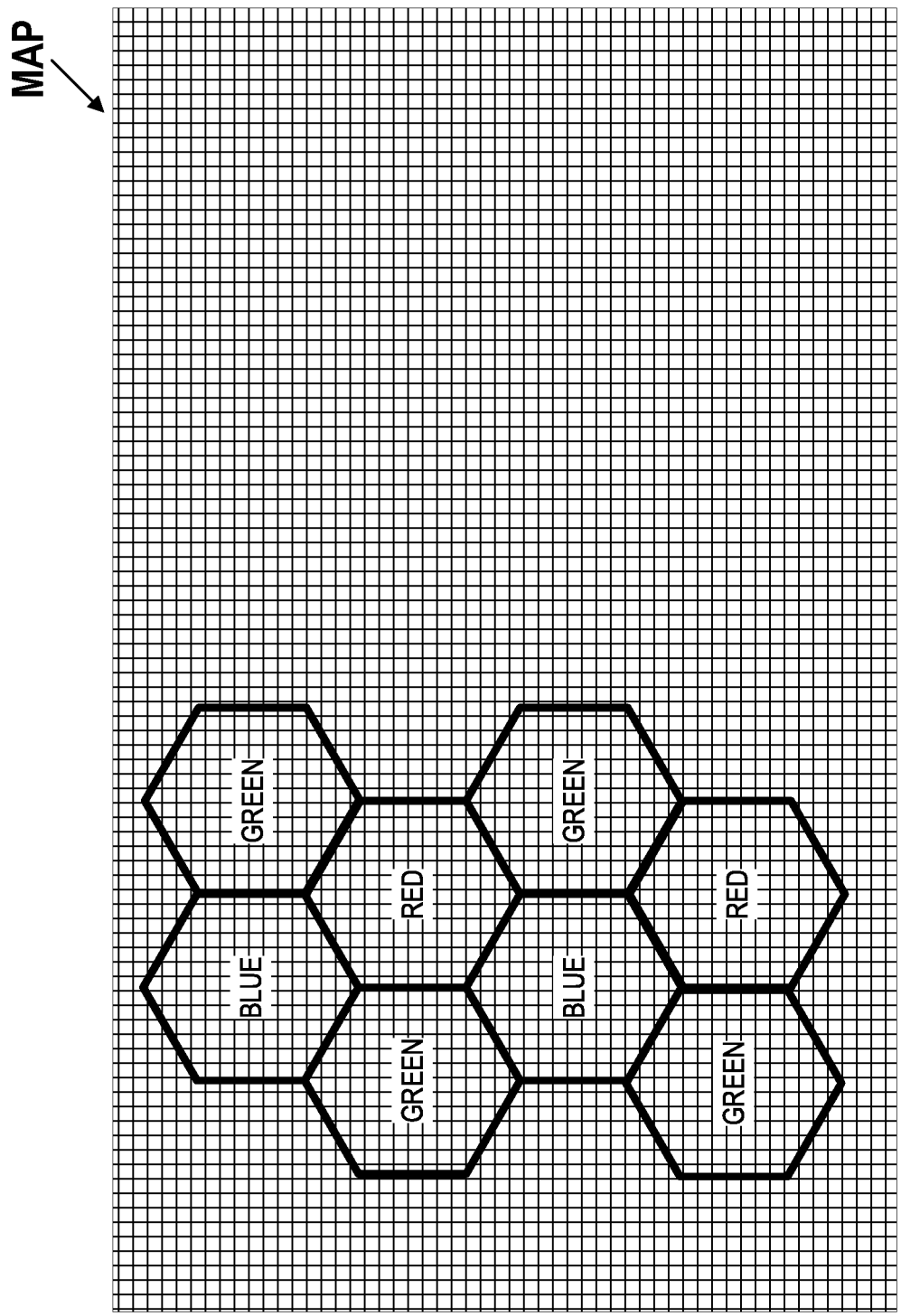
FIG. 11 illustrates a number of hexagon-shaped MBSFN areas covering a desired geographical area that are auto created in accordance with some embodiments of the present disclosure.

Hexagons provide a two-dimensional pattern that guarantees that a web of any size can be built if you use three different types of hexagons (patterns) of identical size, where two hexagons of the same type are never next to each other, as illustrated in FIG. 11.

Using the MBMS area manager map tool 412, the operator draws a polygon (or otherwise defines a polygon) on a map to indicate where he or she would like to generate MBSFN areas, inputs a MBSFN area radius (and/or MBSFN area presented as a hexagon), inputs a MBSFN area overlap amount (e.g., percentage), and selects MBSFN area patterns attributed to the same pattern type to be used. The MBMS area manager map tool 412 then automatically creates the MBSFN hexagon areas, allocates the MBSFN patterns to the created MBSFN hexagon areas (i.e., hexagon shaped MBSFN areas) without conflict, and generates the MBSFN area MOs which will be configured in RAN. Preferably, the MBMS area manager map tool 412 presents a map to the operator at the user terminal 410 that illustrates the MBSFN hexagon areas. If the coverage area of a particular cell overlaps with an MBSFN Hexagon area, the cell will be included in the MBSFN hexagon area. If the coverage area of a particular cell overlaps with multiple MBSFN hexagon areas, the cell will, at least in one embodiment, be included in the multiple MBSFN hexagon areas for better MBSFN coverage. FIG. 11 shows an example of a map presented to the operator that shows the MBSFN hexagon areas auto generated by the MBMS area manager map tool 412. In this example, three MBSFN area patterns of the same MBSFN area pattern type have been created, where the three patterns are colored in green, blue, and red. The green MBSFN area pattern includes four MBSFN hexagon areas, the blue MBSFN area pattern includes two MBSFN hexagon areas, and the red MBSFN area pattern includes two MBSFN hexagon areas.

In one embodiment, if the coverage area of a particular cell is fully included in one MBSFN hexagon area, the cell is attributed to this MBSFN hexagon area and one MBSFN area MO is created for this cell based on the MBSFN area pattern assigned for this MBSFN hexagon area. Further, in the same embodiment, if the coverage of a particular cell overlap with multiple MBSFN hexagon areas, multiple MBSFN area MOs are created based on the MBSFN area profile assigned to the MBSFN hexagon areas. One cell could be associated to one or multiple MBSFN areas.

If the operator would like to extend the broadcast areas, via the MBMS area manager map tool 412, the operator defines (e.g., draws) a new polygon and applies the correct MBSFN configuration as described above. In response, the MBMS area manager map tool 412 generates a new set of MBSFN hexagon areas.

FIG. 12

Figure 12:
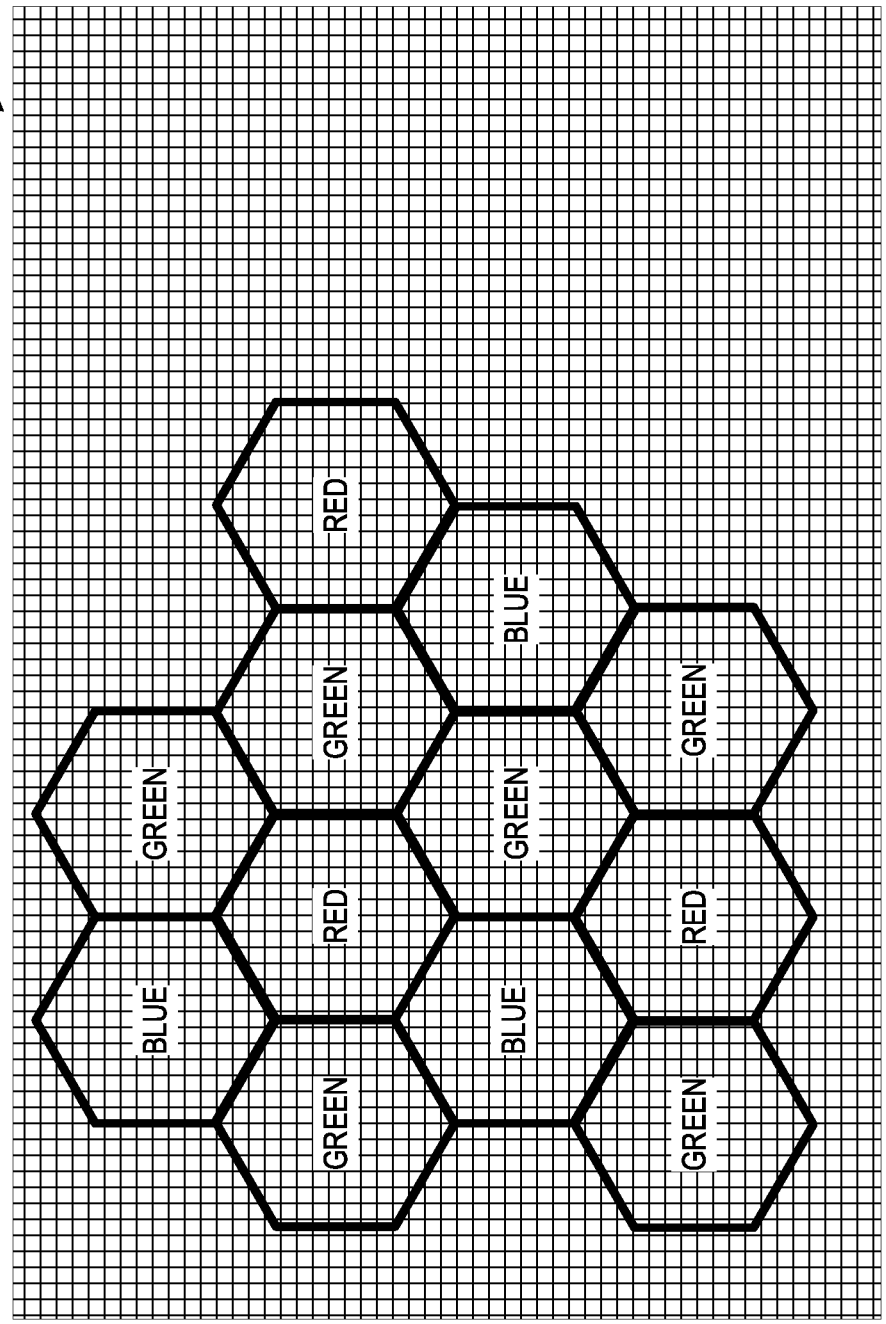
FIG. 12 illustrates one example of an extension of the set of MBSFN hexagon areas shown in FIG. 11 to further include a number of new MBSFN hexagon areas on the right-hand side of FIG. 12.

As an example, FIG. 12 illustrates one example of an extension of the set of MBSFN hexagon areas shown in FIG. 11 to further include a number of new MBSFN hexagon areas on the right-hand side of FIG. 12.

If the operator uses the same MBSFN area patterns for this new polygon area, the CEC 402, and more specifically the MBMS area manager map tool 412, detects whether each of the new generated MBSFN hexagon areas conflicts with any of the neighboring existing MBSFN hexagon areas. If there is a conflict, the MBMS area manager map tool 412 forces the operator to adjust the newly generated MBSFN hexagon areas to remove the conflict. FIG. 12 illustrates an example of a conflict where the new MBSFN hexagon areas in the green MBSFN area pattern are in conflict with the neighbor existing MBSFN hexagon areas in the green MBSFN area pattern. In this case, the CEC 402, and more specifically the MBMS area manager map tool 412, alerts the operator of the conflict and forces the operator to adjust the hexagon patterns for the new MBSFN hexagon areas to remove the conflict.

FIG. 13

Figure 13:
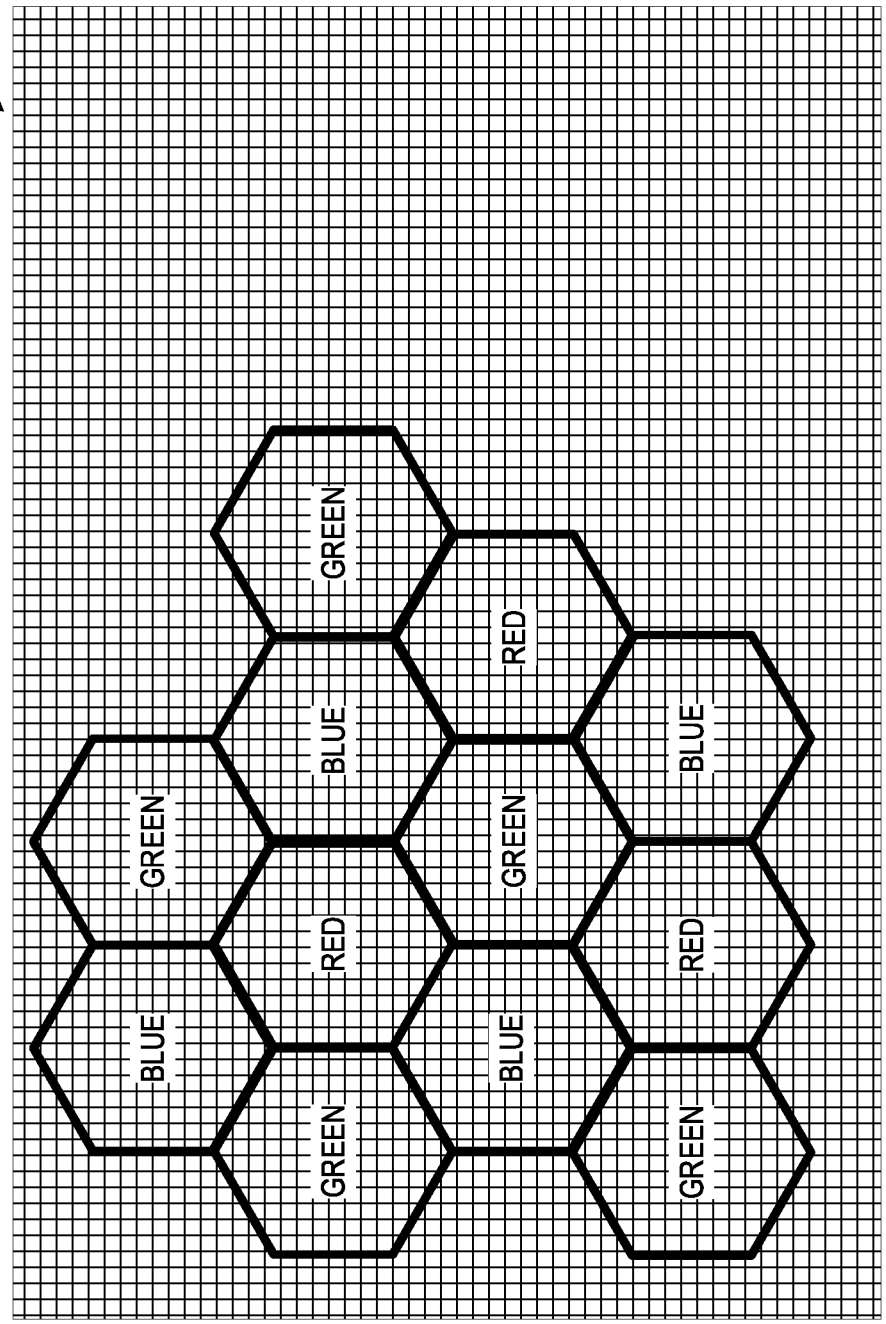
FIG. 13 illustrates an extension of FIG. 12 after conflict detection and resolution is performed in accordance with some embodiments of the present disclosure.

The updated hexagon areas are shown in FIG. 13, where the new MBSFN hexagon areas originally in the green MBSFN area pattern are changed to the blue MBSFN area pattern, the new MBSFN hexagon areas originally in the blue MBSFN area pattern are changed to the red MBSFN area pattern, and the new MBSFN hexagon areas originally in the red MBSFN area pattern are changed to the green MBSFN area pattern. By doing so, the conflict is removed.

In some embodiments, the CEC 402, and more specifically the MBMS area manager map tool 412, performs a procedure to detect conflicting neighboring MBSFN hexagon areas, where this conflict detection procedure includes the following steps:
1. The CEC 402, and more specifically the MBMS area manager map tool 412, determines whether a new MBSFN hexagon area overlaps with an existing MBSFN hexagon area.
    a. If there is an overlap, the CEC 402, and more specifically the MBMS area manager map tool 412, determines whether the MBSFN area pattern to which the new MBSFN hexagon area is allocated is the same as the MBSFN hexagon area to which the overlapping existing MBSFN hexagon area is allocated. If the MBSFN area pattern is the same, the CEC 402, and more specifically the MBMS area manager map tool 412, alerts the operator. If the MBSFN area pattern of the new MBSFN hexagon area is different than that of the overlapping existing MBSFN hexagon area, the process continues to step 2.
    b. If there is no overlap, the process continues to step 2.
2. The CEC 402, and more specifically the MBMS area manager map tool 412, determines whether a distance of a new MBSFN hexagon area and a neighboring MBSFN hexagon area is larger than maximum cell radius in the area.

FIG. 14

Figure 14:
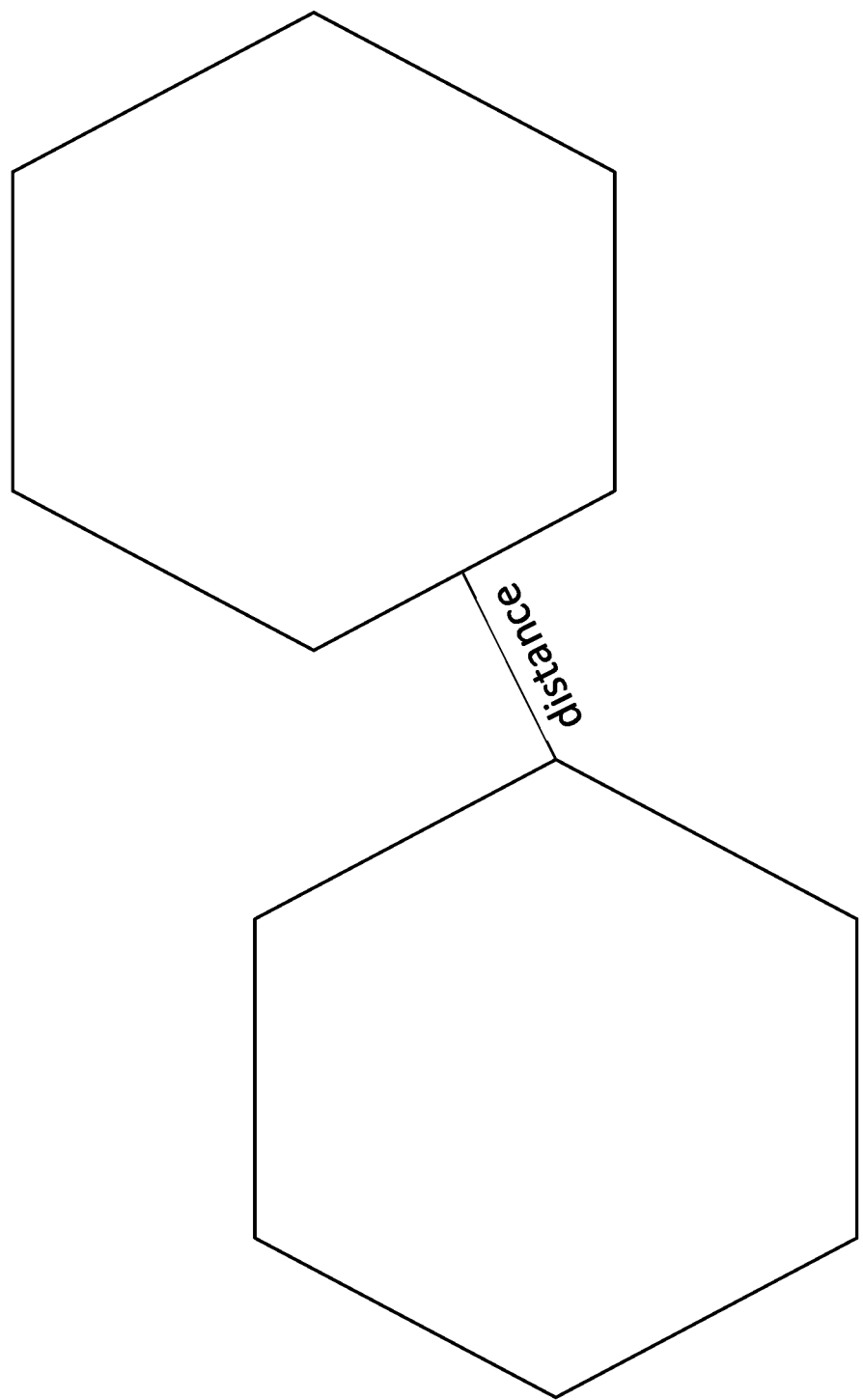
FIG. 14 illustrates an example of distance between two neighboring MBSFN areas.

The distance between the new MBSFN hexagon area and the neighboring MBSFN area is the shortest distance between two lines if the MBSFN areas could be transformed to lines (see FIG. 14 as an example).
    a. If the distance is less than the cell radius, the CEC 402, and more specifically the MBMS area manager map tool 412, determines whether the new MBSFN hexagon area and the neighboring MBSFN hexagon area are in the same MBSFN area pattern. If it is yes, the CEC 402, and more specifically the MBMS area manager map tool 412, alerts the operator. Otherwise, the process continues by repeating step 1 for another new MBSFN hexagon area and neighboring MBSFN hexagon area pair.
    b. If the distance is larger than the cell radius, the CEC 402, and more specifically the MBMS area manager map tool 412, continues by repeating step 1 for another new MBSFN hexagon area and neighboring MBSFN hexagon area pair.

In some embodiments, once there are no conflicts, the CEC 402, and more specifically the MBMS area manager map tool 412, auto generates the MBSFN area MOs for the new MBSFN areas, e.g., in response to the operator selecting an "auto create" button in the GUI presented to the operator at the user terminal 414 via the web browser 416.

FIG. 15

Figure 15:
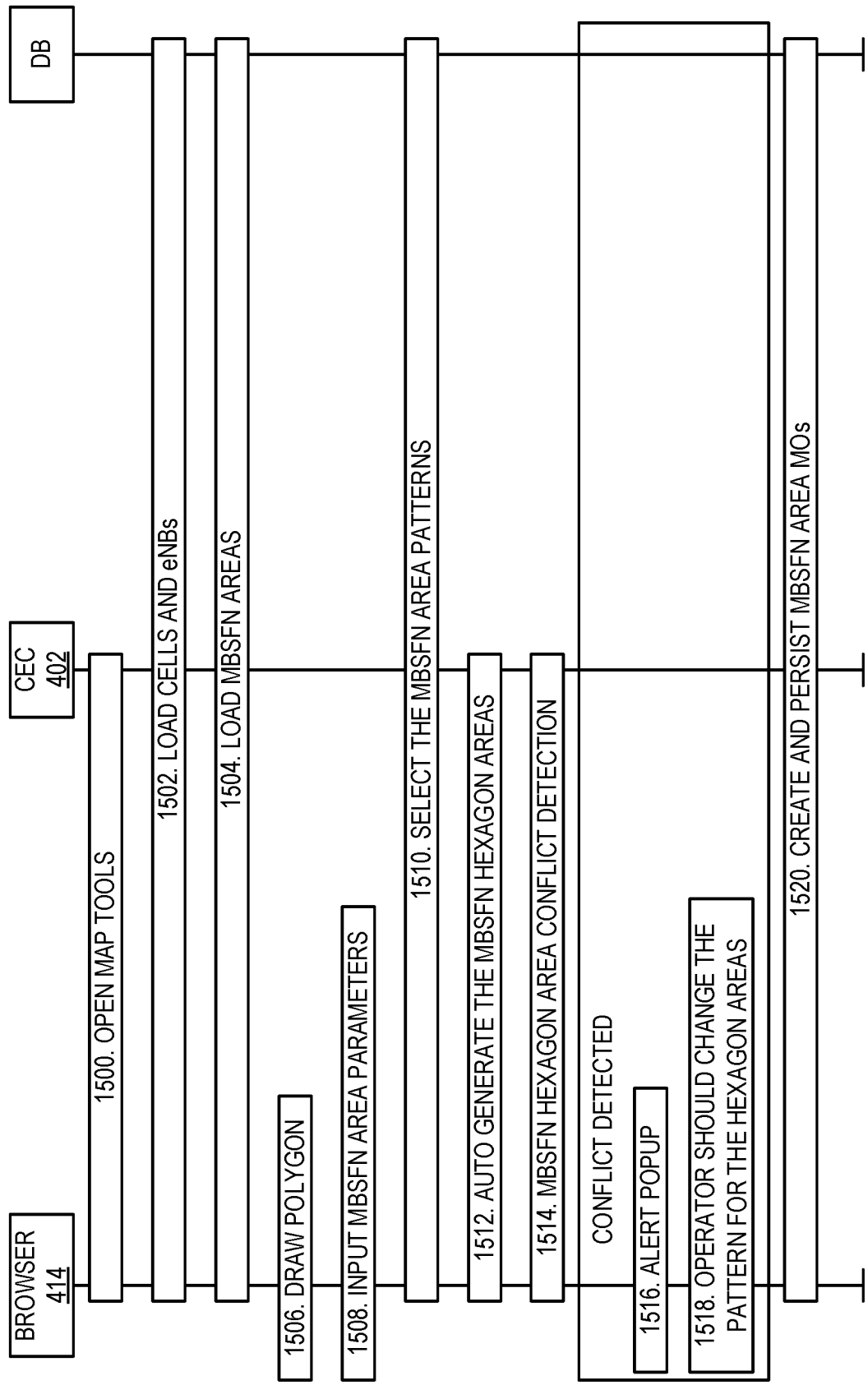
FIG. 15 illustrates the operation of the CEC, and more specifically the MBMS area manager tool, to provide MBSFN area generation in accordance with some embodiments of the present disclosure.

FIG. 15 illustrates the operation of the CEC 402, and more specifically the MBMS area manager map tool 412, to provide MBSFN area generation in accordance with some embodiments of the present disclosure. As illustrated, the MBMS area manager map tool 412 is opened by the operator, e.g., in this example via the web browser 414 (step 1500). The CEC 402, and more specifically the MBMS area manager map tool 412, loads the cell and eNB topology information, as discussed above (step 1502). In addition, the CEC 402, and more specifically the MBMS area manager map tool 412, loads existing MBSFN areas (step 1504). The operator draws or otherwise defines a polygon that defines an area in which MBSFN areas are to be created (step 1506) and inputs parameters for the MBSFN areas to be created (step 1508). The polygon that defines the area in which the MBSFN areas are to be created and the parameters input for the MBSFN areas to be created are communicated to the CEC 402, and more specifically to the MBMS area manager map tool 412. The parameters input for the MBSFN areas include, e.g., a hexagon radius or other information defining the size of the MBSFN areas (expressed as MBSFN hexagon areas), hexagon overlap, and MBSFN area pattern type to be used. The MBSFN area patterns (of the input MBSFN area pattern type) to be used for the MBSFN areas are selected, e.g., by the CEC 402 or more specifically the MBMS area manager map tool 412 or selected by the operator at the web browser 414 (step 1510). Note that, in one example alternative embodiment, the MBSFN area patterns to be used may be manually selected by the operator.

The CEC 402, and more specifically the MBMS area manager map tool 412, performs a procedure to auto generate the MBSFN hexagon areas, as described above (step 1512). In addition, once the new MBSFN hexagon areas are generated, the CEC 402, and more specifically the MBMS area manager map tool 412, performs a procedure to detect any conflicts between the new MBSFN hexagon areas and any existing MBSFN hexagon areas (step 1514). If a conflict is detected, the CEC 402, and more specifically the MBMS area manager map tool 412, notifies the operator via, in this example, an alert popup at the web browser 414 (step 1516) and enables the operator to resolve the conflict, as described above (step 1518). Once any conflicts are resolved, the CEC 402, and more specifically the MBMS area manager map tool 412, creates and stores MBSFN area MOs for the newly created MBSFN areas (step 1520).

According to the Quality of Experience (QoE) of broadcast, the operator may optimize the MBSFN broadcast coverage by, for example, adding more cells to support broadcast. When the newly added cells are ingested into the CEC 402, they will be presented on the MBMS area manager map tool 412. If the cell coverage of a new cell overlaps with an existing MBSFN hexagon area, the new cell will be associated with this MBSFN hexagon area through a hexagon area update procedure.

Furthermore, if the operator would like to extend the broadcast areas to a new geographical area, for example in another city or state, where the broadcast was not supported before, the operator upgrades the eNB's firmware, software, or both firmware and software, and then configures the eNBs to support the broadcast. The way to ingest the cells and configure the MBSFN Hexagon areas in this new geographical area is same as the steps from sections 1, 2, and 3 above.

4 MOs Manipulation

After the MBSFN area MOs are generated by the CEC 402, the operator could upload and enable the MBSFN areas configuration to the RAN via, for example, an OSS restful Application Program Interface (API) from the MBMS area manager map tool 412.

FIG. 16

Figure 16:
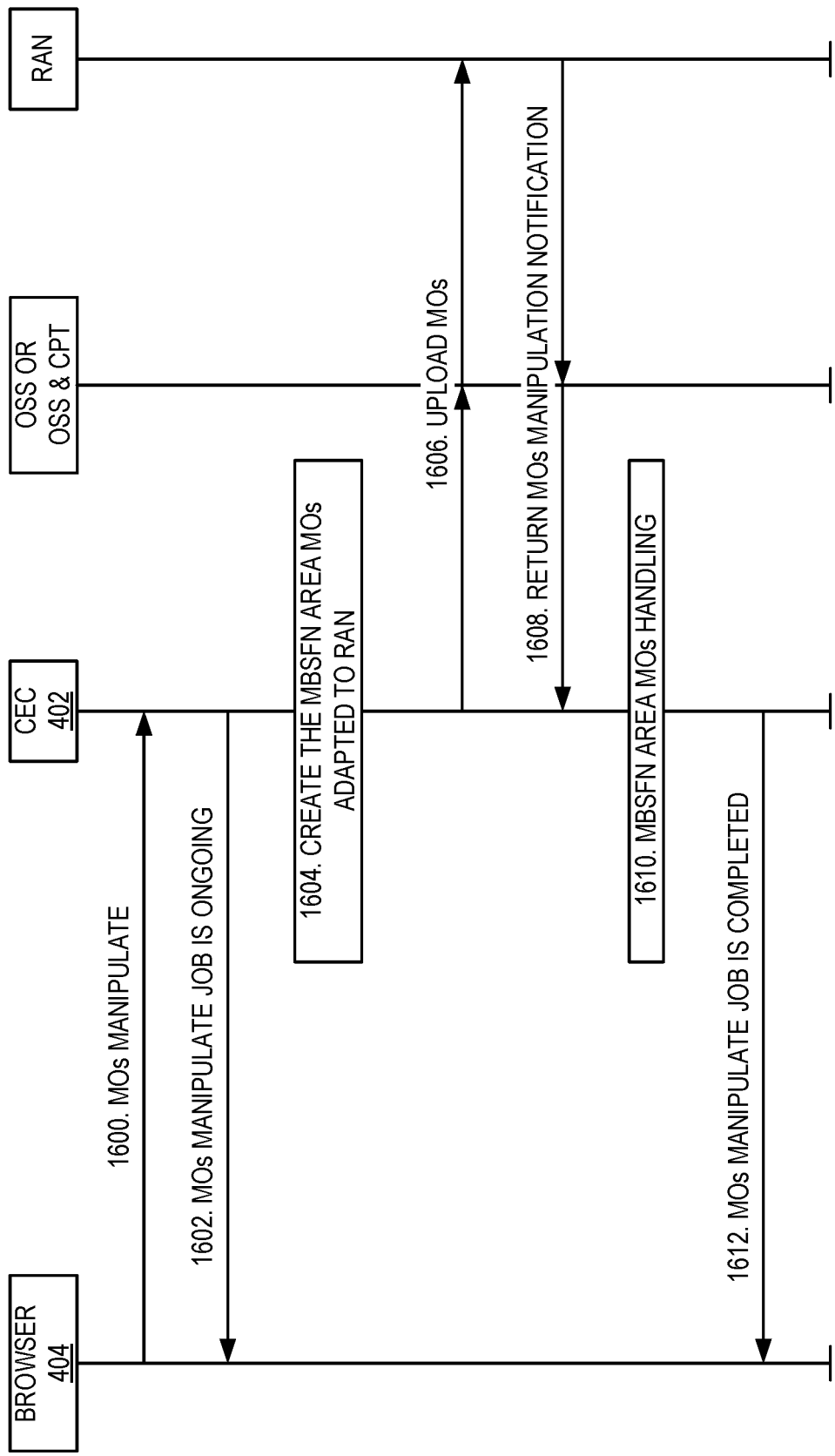
FIG. 16 illustrates a procedure for manipulating Managed Object(s) (MO(s)) of MBSFN area(s) in accordance with some embodiments of the present disclosure.

This is illustrated in the example process of FIG. 16. As illustrated in FIG. 16, using the MBMS area manager map tool 412, the operator manipulates the MO(s) of a MBSFN area(s) (steps 1600 and 1602). The CEC 402, and more specifically the MBMS area manager map tool 412, creates the resulting MBSFN area MOs adapted to the RAN (e.g., adapted to the MO definition of the particular network operator where different network operators may have different MO definitions) (step 1604). The CEC 402, and more specifically the MBMS area manager map tool 412, provides the MBSFN area MOs to the OSS or OSS & CPT, which in turn provides the MBSFN area MOs to the RAN (step 1606). A notification may be sent from the RAN back to the CEC 402 (step 1608). The CEC 402, and more specifically the MBMS area manager map tool 412, performs handling of the MBSFN area MOs (e.g., change the MBSFN area and cell status based on the feedback) (step 1610). The CEC 402, and more specifically the MBMS area manager map tool 412, notifies the operator that the manipulation of the MBSFN area MOs is complete (step 1612).

FIG. 17

Figure 17:
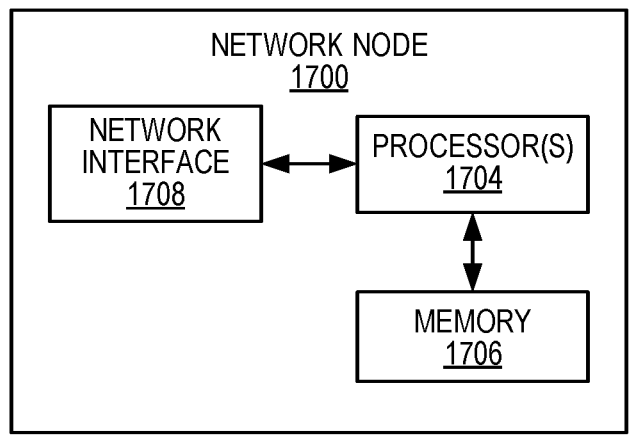
FIG. 17 is a schematic block diagram of a network node according to some embodiments of the present disclosure.

FIG. 17 is a schematic block diagram of a network node 1700 according to some embodiments of the present disclosure. The network node 1700 may be, for example, a node that implements the functionality of the CEC 402 including the MBMS area manager map tool 412 or part of the functionality of the CEC 402 including part of the functionality of the MBMS area manager map tool 412 (e.g., in the case where the functionality of the MBMS area manager map tool 412 is distributed across two or more network nodes). As illustrated, the network node 1700 includes one or more processors 1704 (e.g., CPUs, Application Specific Integrated Circuits (ASICs), Field Programmable Gate Arrays (FPGAs), and/or the like), memory 1706, and a network interface 1708. The one or more processors 1704 are also referred to herein as processing circuitry. The one or more processors 1704 operate to provide one or more functions of the CEC 402 or one or more functions of the MBMS area manager map tool 412, as described herein. In some embodiments, the function(s) are implemented in software that is stored, e.g., in the memory 1706 and executed by the one or more processors 1704.

Notably, the user terminal 410 may have a similar architecture as the network node 1700.

FIG. 18

Figure 18:
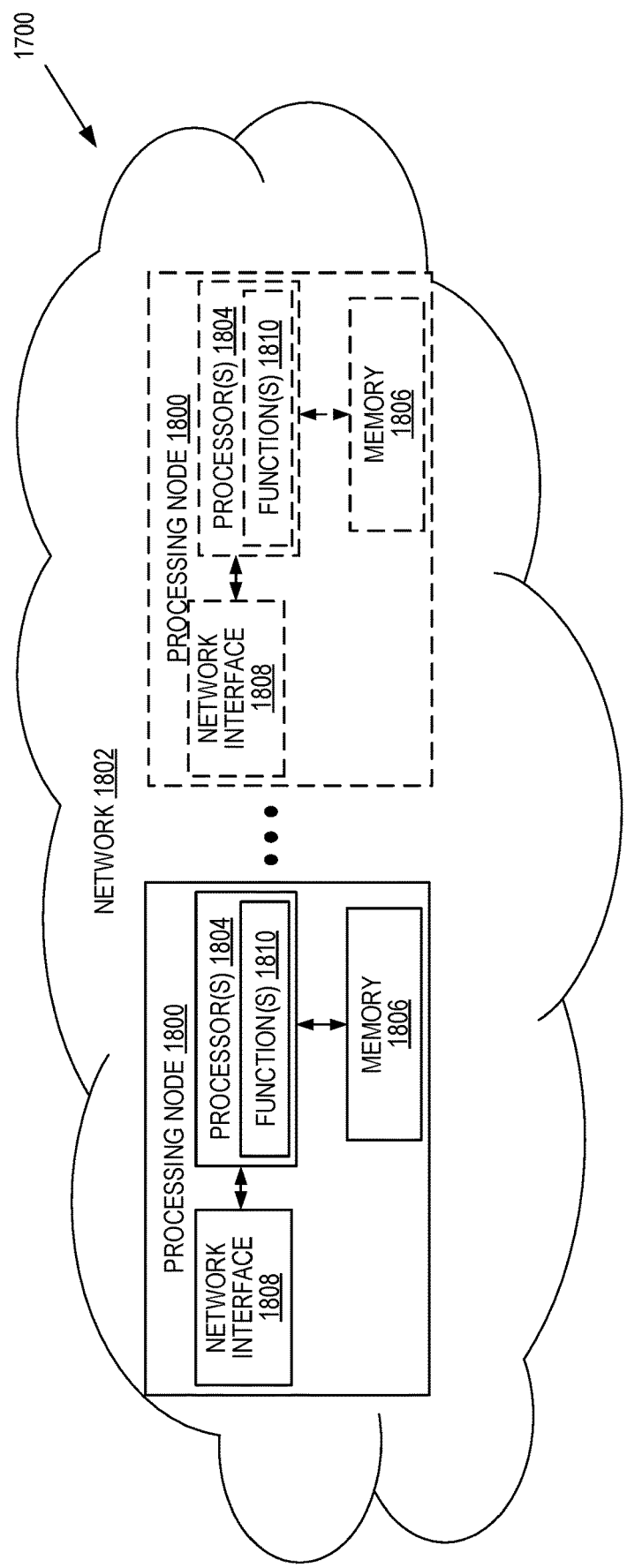
FIG. 18 is a schematic block diagram that illustrates a virtualized embodiment of the network node of FIG. 17 according to some embodiments of the present disclosure.

FIG. 18 is a schematic block diagram that illustrates a virtualized embodiment of the network node 1700 according to some embodiments of the present disclosure. As used herein, a "virtualized" network node is an implementation of the network node 1700 in which at least a portion of the functionality of the network node 1700 is implemented as a virtual component(s) (e.g., via a virtual machine(s) executing on a physical processing node(s) in a network(s))). As illustrated, in this example, the network node 1700 includes one or more processing nodes 1800 coupled to or included as part of a network(s) 1802. Each processing node 1800 includes one or more processors 1804 (e.g., CPUs, ASICs, FPGAs, and/or the like), memory 1806, and a network interface 1808. In this example, functions 1810 of the network node 1700 described herein (e.g., one or more functions of the CEC 402 including the MBMS area manager map tool 412) are implemented at the one or more processing nodes 1800 in any desired manner. In some particular embodiments, some or all of the functions 1810 of the network node 1700 described herein are implemented as virtual components executed by one or more virtual machines implemented in a virtual environment(s) hosted by the processing node(s) 1800. In some embodiments, a computer program including instructions which, when executed by at least one processor, causes the at least one processor to carry out the functionality of the network node 1700 or a node (e.g., a processing node 1800) implementing one or more of the functions 1810 of the network node 1700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 19

Figure 19:
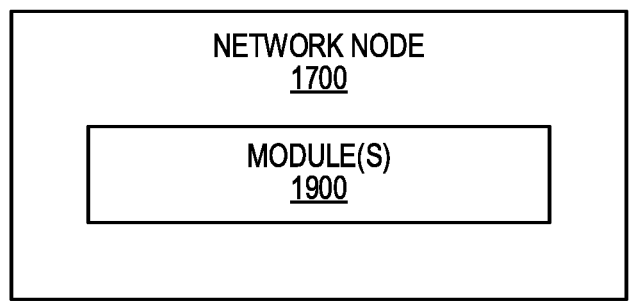
FIG. 19 is a schematic block diagram of the network node of FIG. 17 according to some other embodiments of the present disclosure.

FIG. 19 is a schematic block diagram of the network node 1700 according to some other embodiments of the present disclosure. The network node 1700 includes one or more modules 1900, each of which is implemented in software. The module(s) 1900 provide the functionality of the network node 1700 described herein. This discussion is equally applicable to the processing node 1800 of FIG. 18 where the modules 1900 may be implemented at one of the processing nodes 1800 or distributed across multiple processing nodes 1800 and/or distributed across the processing node(s) 1800 and the control system 1702.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.). At least some of the following abbreviations may be used in this disclosure. If there is an inconsistency between abbreviations, preference should be given to how it is used above. If listed multiple times below, the first listing should be preferred over any subsequent listing(s).

AS Application Server
BM-SC Broadcast-Multicast Service Center
CEC Critical Enhanced Multicast-Broadcast Multimedia Service Controller
CPT Cell Planning Tool
eMBMS Enhanced Multicast-Broadcast Multimedia Service
eNB Enhanced or Evolved Node B
ID Identifier
KPI Key Performance Indicator
MBMS Multicast-Broadcast Multimedia Service
MBSFN Multicast-Broadcast Single Frequency Network
MC Mission Critical
MCCH Multicast Control Channel
MCE Multi-Cell/Multicast Coordination Entity
MCH Multicast Channel
MCS Modulation Coding Scheme
MO Managed Object
MSP Multicast Channel Scheduling Period
MTCH Multicast Traffic Channel
PTM Point to Multipoint
PTP Point to Point
PTT Push-to-Talk
QoE Quality of Experience
RAN Radio Access Network
TS Technical Specification
UE User Equipment Those skilled in the art will recognize improvements and modifications to the embodiments of the present disclosure. All such improvements and modifications are considered within the scope of the concepts disclosed herein.

The invention claimed is:

1. A method performed by a Multicast-Broadcast Multimedia Service (MBMS) area manager tool implemented by one or more network nodes for programmatically creating Multicast-Broadcast Single Frequency Network (MBSFN) areas, the method comprising:
    creating a plurality of MBSFN area patterns, wherein for each MBSFN area pattern of the plurality of MBSFN area patterns:
        the MBSFN area pattern comprises one or more subframe configurations for MBMS resource allocation; and
        each subframe configuration of the MBSFN area pattern defines a set of subframes for MBMS resource allocation for the MBSFN area pattern; and
    creating a plurality of MBSFN areas that cover a desired geographical area using a select one or more of the plurality of MBSFN area patterns,
    wherein the plurality of MBSFN areas is a plurality of hexagon-shaped MBSFN areas, and creating the plurality of MBSFN areas comprises creating the plurality of hexagon-shaped MBSFN areas that cover the desired geographical area using three or more select MBSFN area patterns from among the plurality of MBSFN area patterns, and
    wherein creating the plurality of hexagon-shaped MBSFN areas comprises:
        obtaining input from an operator that defines the desired geographical area;
        obtaining input from the operator that defines one or more parameters related to creation of the plurality of hexagon-shaped MBSFN areas, the one or more parameters comprising information that indicates a desired MBSFN area pattern type;
        selecting the three or more selected MBSFN area patterns from a plurality of MBSFN area patterns predefined for the desired MBSFN area pattern type; and
        generating the plurality of hexagon-shaped MBSFN areas using the three or more selected MBSFN area patterns.

2. The method of claim 1 wherein the plurality of MBSFN areas is a plurality of hexagon-shaped MBSFN areas.

3. The method of claim 1 wherein the plurality of MBSFN area patterns comprise two or more MBSFN area patterns for each of two or more MBSFN area pattern types.

4. The method of claim 3 wherein the two or more MBSFN area pattern types are for different cell coverage conditions, different cell density conditions, or both different cell coverage conditions and different cell density conditions.

5. The method of claim 1 wherein creating the plurality of MBSFN area patterns comprises:
- detecting and resolving one or more conflicts between the one or more subframe configurations of a particular MBSFN area pattern; and/or
- detecting and resolving one or more conflicts between the one or more subframe configurations of one of the plurality of MBSFN area patterns and the one or more subframe configurations of a different one of the plurality of MBSFN area patterns.

6. The method of claim 1 wherein creating the plurality of MBSFN area patterns comprises:
- obtaining, from an operator, two or more subframe configurations for a new MBSFN area pattern;
- determining that a first subframe configuration of the two or more subframe configurations for the new MBSFN area pattern conflicts with a second subframe configuration of the two or more subframe configurations for the new MBSFN area pattern; and
- upon determining that the first subframe configuration conflicts with the second subframe configuration, forcing the operator to resolve the conflict.

7. The method of claim 6 wherein creating the plurality of MBSFN area patterns further comprises:
- determining that at least one of the two or more subframe configurations of the new MBSFN area pattern conflicts with at least one of two or more subframe configurations of an existing MBSFN area pattern comprised in the plurality of MBSFN area patterns; and
- upon determining that at least one of the two or more subframe configurations of the new MBSFN area pattern conflicts with at least one of the two or more subframe configurations of the existing MBSFN area pattern, forcing the operator to resolve the conflict.

8. The method of claim 7 wherein, once there are no conflicts for the new MBSFN area pattern, storing the MBSFN area pattern as one of the plurality of MBSFN area patterns.

9. The method of claim 1 wherein creating the plurality of hexagon-shaped MBSFN areas further comprises:
- determining that there is a conflict between two or more of the plurality of hexagon-shaped MBSFN areas; and
- upon determining that there is a conflict between two or more of the plurality of hexagon-shaped MBSFN areas, forcing the operator to resolve the conflict.

10. The method of claim 1 further comprising creating and persisting Managed Objects (MOs) for the plurality of hexagon-shaped MBSFN areas.

11. A system that implements a Multicast-Broadcast Multimedia Service (MBMS) area manager tool implemented for programmatically creating Multicast-Broadcast Single Frequency Network (MBSFN) areas, the MBMS area manager tool adapted to:
- create a plurality of MBSFN area patterns, wherein for each MBSFN area pattern of the plurality of MBSFN area patterns:
  - the MBSFN area pattern comprises one or more subframe configurations for MBMS resource allocation; and
  - each subframe configuration of the MBSFN area pattern defines a set of subframes for MBMS resource allocation for the MBSFN area pattern; and
- create a plurality of MBSFN areas that cover a desired geographical area using a select one or more of the plurality of MBSFN area patterns,
- wherein the plurality of MBSFN areas is a plurality of hexagon-shaped MBSFN areas, and creating the plurality of MBSFN areas comprises creation of the plurality of hexagon-shaped MBSFN areas that cover the desired geographical area using three or more select MBSFN area patterns from among the plurality of MBSFN area patterns, and
- wherein creation of the plurality of hexagon-shaped MBSFN areas comprises:
  - obtain input from an operator that defines the desired geographical area;
  - obtain input from the operator that defines one or more parameters related to creation of the plurality of hexagon-shaped MBSFN areas, the one or more parameters comprising information that indicates a desired MBSFN area pattern type;
  - select the three or more selected MBSFN area patterns from a plurality of MBSFN area patterns predefined for the desired MBSFN area pattern type; and
  - generate plurality of hexagon-shaped MBSFN areas using the three or more selected MBSFN area patterns.

12. The system of claim 11 further comprising one or more network nodes that implement the MBMS area manager tool, each network node of the one or network nodes comprising:
- a network interface; and
- processing circuitry associated with the network interface, wherein the processing circuitry is configured to cause the network node to implement at least part of the MBMS area manager tool.

\* \* \* \* \*